US010480615B2

(12) United States Patent
Oi et al.

(10) Patent No.: US 10,480,615 B2
(45) Date of Patent: Nov. 19, 2019

(54) VIBRATION DAMPING DEVICE AND METHOD OF DESIGNING THE SAME

(71) Applicant: AISIN AW CO., LTD., Anjo-shi, Aichi-ken (JP)

(72) Inventors: Yoichi Oi, Ama (JP); Hiroki Nagai, Anjo (JP); Masaki Wajima, Nagoya (JP); Takao Sakamoto, Anjo (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 0 days.

(21) Appl. No.: 16/070,419

(22) PCT Filed: Mar. 16, 2017

(86) PCT No.: PCT/JP2017/010794
§ 371 (c)(1),
(2) Date: Jul. 16, 2018

(87) PCT Pub. No.: WO2017/159827
PCT Pub. Date: Sep. 21, 2017

(65) Prior Publication Data
US 2019/0024752 A1  Jan. 24, 2019

(30) Foreign Application Priority Data

Mar. 16, 2016 (JP) ................................ 2016-052599
Aug. 16, 2016 (JP) ................................ 2016-159617

(51) Int. Cl.
*F16F 15/14* (2006.01)
*F16F 15/12* (2006.01)
(Continued)

(52) U.S. Cl.
CPC ........ *F16F 15/145* (2013.01); *F16F 15/1205* (2013.01); *F16F 15/134* (2013.01);
(Continued)

(58) Field of Classification Search
CPC ...... F16F 15/1205; F16F 15/134; F16F 15/14; F16F 15/145; F16F 15/1471;
(Continued)

(56) References Cited

U.S. PATENT DOCUMENTS 9,133,906 B2 * 9/2015 Takikawa ............... F16F 15/145
9,133,907 B2 * 9/2015 Takikawa ............... F16F 15/173
(Continued)

FOREIGN PATENT DOCUMENTS

DE  10 2012 212 854 A1  2/2013
JP  1-312246 A  12/1989
(Continued)

OTHER PUBLICATIONS

Communication dated Nov. 19, 2018 issued by the European Patent Office in counterpart European application No. 17766822.5.
(Continued)

*Primary Examiner* — Adam D Rogers
(74) *Attorney, Agent, or Firm* — Sughrue Mion, PLLC

(57) ABSTRACT

A vibration damping device including: a support member rotating with a rotary element to which torque from an engine is transferred about the center of rotation of the rotary element; a restoring force generation member coupled to the support member and swingable with rotation of the support member; and an inertial mass body coupled to the support member via the restoring force generation member and swung about the center of rotation in conjunction with the restoring force generation member with rotation of the support member. The order of the vibration damping device is larger than the sum of the excitation order of the engine and an offset value determined in consideration of the effect of oil in the oil chamber. The reference order, which is a convergent value of the order of the vibration damping device, is higher than the excitation order.

20 Claims, 16 Drawing Sheets

(51) Int. Cl.
  *F16F 15/134* (2006.01)
  *F16H 45/02* (2006.01)
(52) U.S. Cl.
  CPC .......... *F16F 15/14* (2013.01); *F16F 15/1471* (2013.01); *F16H 45/02* (2013.01); *F16F 2222/08* (2013.01); *F16F 2228/001* (2013.01); *F16H 2045/0263* (2013.01)
(58) Field of Classification Search
  CPC ............ F16F 2222/08; F16F 2228/001; F16F 2230/00; F16F 2232/02; F16H 45/02; F16H 2045/0263; G06F 17/5095; G06F 2217/16
  See application file for complete search history.

(56) References Cited

U.S. PATENT DOCUMENTS

| | | | |
|---|---|---|---|
| 10,132,384 B2* | 11/2018 | Takikawa | F16F 15/145 |
| 2010/0242466 A1 | 9/2010 | Krause et al. | |
| 2014/0090514 A1 | 4/2014 | Tögel et al. | |
| 2016/0252156 A1 | 9/2016 | Boulet et al. | |
| 2017/0037929 A1 | 2/2017 | Takikawa et al. | |
| 2017/0097064 A1 | 4/2017 | Tsuji et al. | |
| 2018/0187744 A1* | 7/2018 | Takikawa | F16F 15/1471 |
| 2018/0223948 A1* | 8/2018 | Takikawa | F16F 15/1205 |
| 2018/0372182 A1* | 12/2018 | Takikawa | F16F 15/134 |
| 2019/0003554 A1* | 1/2019 | Nagai | F16F 15/134 |
| 2019/0226552 A1* | 7/2019 | Oi | F16F 15/145 |

FOREIGN PATENT DOCUMENTS

| | | |
|---|---|---|
| JP | 2001-263424 A | 9/2001 |
| JP | 2011-504987 A | 2/2011 |
| JP | 2012-082862 A | 4/2012 |
| JP | 2014-516142 A | 7/2014 |
| JP | 2016-014425 A | 1/2016 |
| WO | 2015/063430 A1 | 5/2015 |
| WO | 2015/108130 A1 | 7/2015 |
| WO | 2015/151654 A1 | 10/2015 |
| WO | 2015/173086 A1 | 11/2015 |
| WO | 2017/057681 A1 | 4/2017 |

OTHER PUBLICATIONS

International Search Report for PCT/JP2017/010794 dated Jun. 20, 2017 [PCT/ISA/210].

* cited by examiner

VIBRATION DAMPING DEVICE AND METHOD OF DESIGNING THE SAME

CROSS REFERENCE TO RELATED APPLICATIONS

This application is a National Stage of International Application No. PCT/JP2017/010794 filed Mar. 16, 2017, claiming priority based on Japanese Patent Application No. 2016-052599 filed Mar. 16, 2016 and 2016-159617 filed Aug. 16, 2016.

TECHNICAL FIELD

Aspects of the present disclosure relate to a vibration damping device that includes a restoring force generation member that is swingable along with rotation of a support member and an inertial mass body coupled to the support member via the restoring force generation member and swung in conjunction with the restoring force generation member along with rotation of the support member, and to a method of designing the vibration damping device.

BACKGROUND ART

There has hitherto been known, as a vibration damping device of this type, a vibration damping device that includes a flywheel mass body that receives a centrifugal force and that functions as a restoring force generation member and an annular inertial mass body coupled to the flywheel mass body via a connecting rod (see Patent Document 1, for example). In such a vibration damping device, when the flywheel mass body is swung along with rotation of a support member, the inertial mass body is swung in conjunction with the swinging motion of the flywheel mass body, and vibration of the support member can be damped by vibration transferred from the inertial mass body to the support member. In addition, there has hitherto been known, as a vibration damping device, a centrifugal-pendulum rotational speed adaptive dynamic absorber that includes a support member coupled to a rotary element rotated by power from a drive device and a mass body coupled to the support member and swung about a pendulum fulcrum (see Patent Document 2, for example). The rotational speed adaptive dynamic absorber is designed to have an effective order qeff that is larger than an excitation order q of the drive device by a predetermined order offset value qF in relation to the effect of oil.

RELATED-ART DOCUMENTS

Patent Documents

[Patent Document 1] German Patent Application Publication No. 102012212854
[Patent Document 2] Published Japanese Translation of PCT Application No. 2011-504987 (JP 2011-504987 A)

SUMMARY

The rotational speed adaptive dynamic absorber described in Patent Document 2 is considered to attempt to cause the order of vibration that may be best damped by the dynamic absorber to coincide with the excitation order q of the drive device by making the effective order qeff higher than the excitation order q by the predetermined order offset value qF in consideration of a resistance (viscous drag) due to relative motion between the mass body and rotating oil. With a centrifugal-pendulum vibration damping device designed in this manner, good vibration damping performance can be basically secured. With the vibration damping device which includes an inertial mass body such as that described in Patent Document 1, in contrast, good vibration damping performance may not be obtained even if the order of vibration that may be best damped by the vibration damping device is caused to coincide with the excitation order of the drive device, and there is still room for improvement in terms of improving the vibration damping performance by setting the order more adequately.

Thus, it is an aspect of the present disclosure to further improve the vibration damping performance of a vibration damping device that includes a restoring force generation member and an inertial mass body swung in conjunction with the restoring force generation member.

The present disclosure provides a vibration damping device disposed in an oil chamber and including: a support member that rotates together with a rotary element, to which torque from an engine is transferred, about a center of rotation of the rotary element; a restoring force generation member that is coupled to the support member and that is swingable along with rotation of the support member; and an inertial mass body coupled to the support member via the restoring force generation member and swung about the center of rotation in conjunction with the restoring force generation member along with rotation of the support member, in which: an order of the vibration damping device is larger than a sum of an excitation order of the engine and an offset value determined in consideration of an effect of oil in the oil chamber; and a reference order, which is a convergent value of the order of the vibration damping device which operates in the oil chamber when an amplitude of vibration of input torque transferred to the rotary element becomes smaller, is higher than the excitation order.

The studies conducted by the inventors revealed that the vibration damping performance of the vibration damping device, which included the restoring force generation member and the inertial mass body which was swung in conjunction with the restoring force generation member, was further improved by making the reference order, which was a convergence value of the order of the vibration damping device when the amplitude of vibration of the input torque became smaller, higher than the excitation order of the engine, rather than by causing the reference order to coincide with the excitation order. Thus, with the vibration damping device which is disposed in the oil chamber, it is possible to further improve the vibration damping performance of the vibration damping device, which includes the restoring force generation member and the inertial mass body which is swung in conjunction with the restoring force generation member, by making the order of the vibration damping device larger than the sum of the excitation order of the engine and an offset value determined in consideration of the effect of oil in the oil chamber and making the reference order higher than the excitation order of the engine.

DETAILED DESCRIPTION OF THE PREFERRED EMBODIMENTS

Now, an embodiment according to the present disclosure will be described with reference to the drawings.

Figure 1:
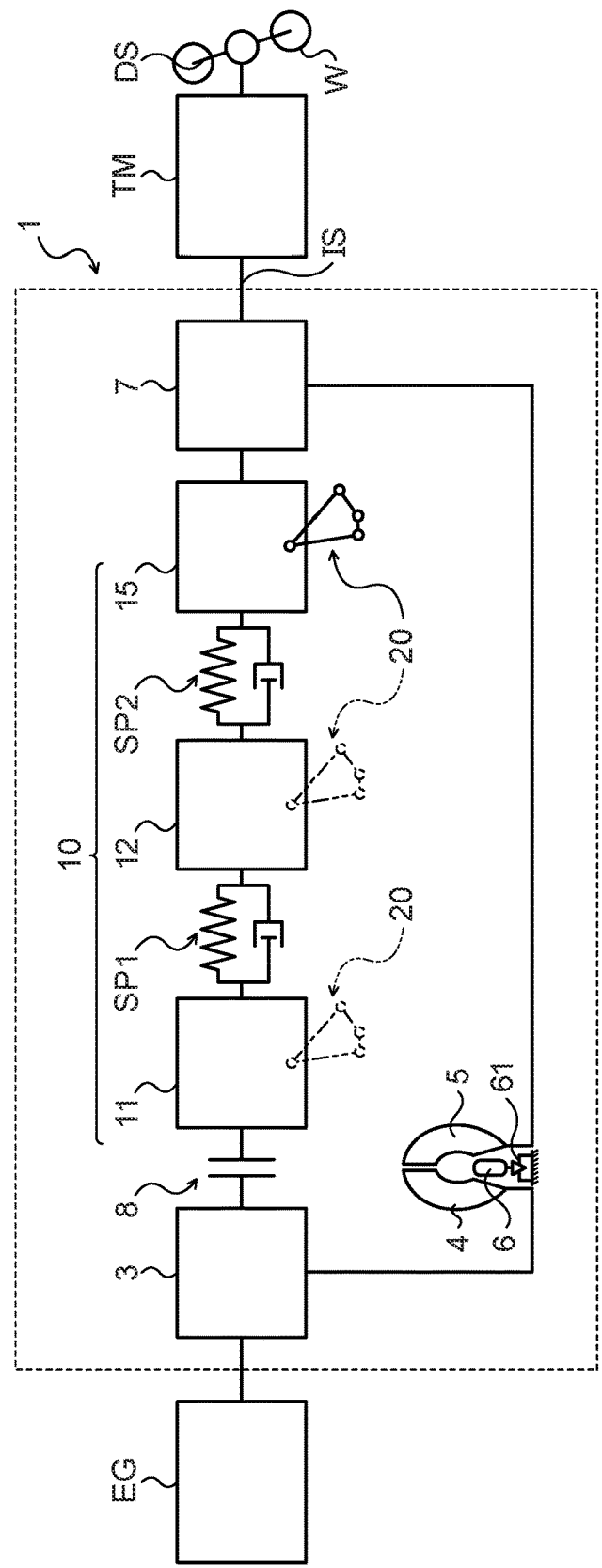
FIG. 1 is a schematic diagram illustrating a starting device that includes a vibration damping device according to the present disclosure.

FIG. 1 is a schematic diagram illustrating a starting device 1 that includes a vibration damping device 20 according to the present disclosure. The starting device 1 illustrated in the drawing is mounted on a vehicle that includes an engine (internal combustion engine) EG that serves as a drive device, for example, and transfers power from the engine EG to drive shafts DS of the vehicle. In addition to the vibration damping device 20, the starting device 1 includes: a front cover 3 that serves as an input member coupled to a crankshaft of the engine EG; a pump impeller (input-side fluid transmission element) 4 fixed to the front cover 3 to rotate together with the front cover 3; a turbine runner (output-side fluid transmission element) 5 that is rotatable coaxially with the pump impeller 4; a damper hub 7 that serves as an output member fixed to an input shaft IS of a transmission (power transfer device) TM that is an automatic transmission (AT), a continuously variable transmission (CVT), a dual clutch transmission (DCT), a hybrid transmission, or a speed reducer; a lock-up clutch 8; a damper device 10; and so forth.

In the following description, unless specifically stated, the term "axial direction" basically indicates the direction of extension of the center axis (axis) of the starting device 1 or the damper device 10 (vibration damping device 20). In addition, unless specifically stated, the term "radial direction" basically indicates the radial direction of the starting device 1, the damper device 10, or a rotary element of the damper device 10 etc., that is, the direction of extension of a line that extends in directions (radial directions) that are orthogonal to the center axis of the starting device 1 or the damper device 10 from the center axis. Further, unless specifically stated, the term "circumferential direction" basically indicates the circumferential direction of the starting device 1, the damper device 10, or a rotary element of the damper device 10 etc., that is, a direction along the rotational direction of such a rotary element.

Figure 2:
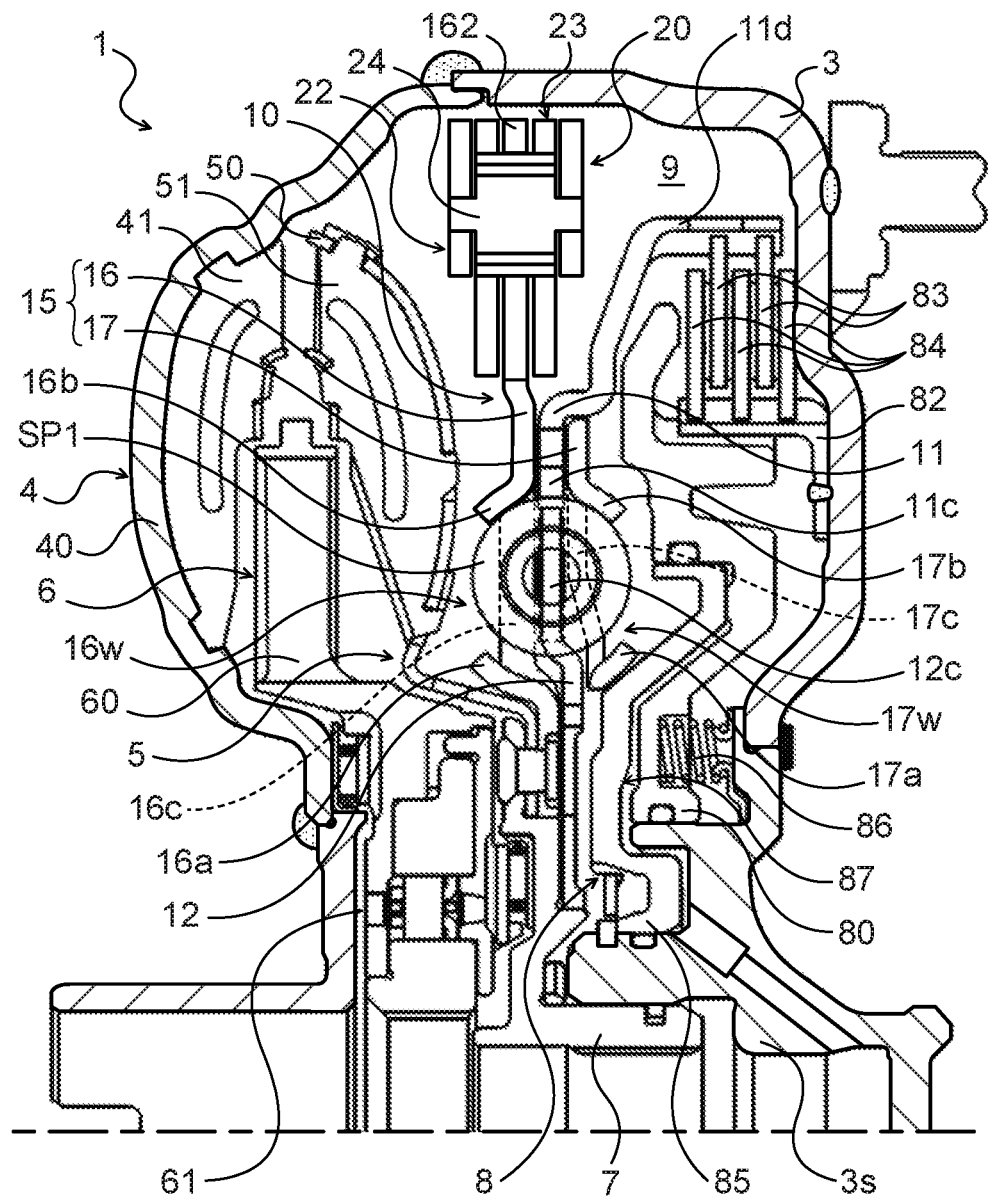
FIG. 2 is a sectional view of the starting device illustrated in FIG. 1.

As illustrated in FIG. 2, the pump impeller 4 has a pump shell 40 tightly fixed to the front cover 3 and a plurality of pump blades 41 disposed on the inner surface of the pump shell 40. As illustrated in FIG. 2, the turbine runner 5 has a turbine shell 50 and a plurality of turbine blades 51 disposed on the inner surface of the turbine shell 50. The inner peripheral portion of the turbine shell 50 is fixed to the damper hub 7 via a plurality of rivets.

The pump impeller 4 and the turbine runner 5 face each other. A stator 6 is disposed between and coaxially with the pump impeller 4 and the turbine runner 5. The stator 6 adjusts a flow of working oil (working fluid) from the turbine runner 5 to the pump impeller 4. The stator 6 has a plurality of stator blades 60. The rotational direction of the stator 6 is set to only one direction by a one-way clutch 61. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 61 may be omitted from the starting device 1, and that the pump impeller 4 and the turbine runner 5 may function as a fluid coupling.

The lock-up clutch 8 is constituted as a hydraulic multi-plate clutch, and can establish and release lock-up in which the front cover 3 and the damper hub 7, that is, the input shaft IS of the transmission TM, are coupled to each other via the damper device 10. The lock-up clutch 8 includes: a lock-up piston 80 supported by a center piece 3s, which is fixed to the front cover 3, so as to be movable in the axial direction; a drum portion 11d that serves as a clutch drum integrated with a drive member 11 which is an input element of the damper device 10; an annular clutch hub 82 fixed to the inner surface of the front cover 3 so as to face the lock-up piston 80; a plurality of first friction engagement plates (friction plates having a friction material on both surfaces) 83 fitted to spines formed on the inner peripheral surface of the drum portion 11d; and a plurality of second friction engagement plates (separator plates) 84 fitted to splines formed on the outer peripheral surface of the clutch hub 82.

The lock-up clutch 8 further includes: an annular flange member (oil chamber defining member) 85 attached to the center piece 3s of the front cover 3 so as to be positioned on the opposite side of the lock-up piston 80 from the front cover 3, that is, on the damper device 10 side with respect to the lock-up piston 80; and a plurality of return springs 86 disposed between the front cover 3 and the lock-up piston 80. As illustrated in the drawing, the lock-up piston 80 and the flange member 85 define an engagement oil chamber 87. Working oil (an engagement hydraulic pressure) is supplied to the engagement oil chamber 87 from a hydraulic control device (not illustrated). Increasing the engagement hydraulic pressure for the engagement oil chamber 87 moves the lock-up piston 80 in the axial direction so as to press the first and second friction engagement plates 83 and 84 toward the front cover 3, which can bring the lock-up clutch 8 into engagement (complete engagement or slip engagement). The lock-up clutch 8 may be constituted as a hydraulic single-plate clutch.

As illustrated in FIGS. 1 and 2, the damper device 10 includes, as rotary elements, the drive member (input element) 11 which includes the drum portion 11d, an intermediate member (intermediate element) 12, and a driven member (output element) 15. The damper device 10 further includes, as torque transfer elements, a plurality of (e.g. four each in the present embodiment) first springs (first elastic bodies) SP1 and second springs (second elastic bodies) SP2 disposed alternately at intervals in the circumferential direction on the same circumference. Arc coil springs, which are made of a metal material wound so as to have an axis that extends arcuately when no load is applied, or straight coil springs, which are made of a metal material spirally wound so as to have an axis that extends straight when no load is applied, are adopted as the first and second springs SP1 and SP2. As illustrated in the drawings, so-called double springs may be adopted as the first and second springs SP1 and SP2.

The drive member 11 of the damper device 10 is an annular member that includes the drum portion 11d on the outer peripheral side, and has a plurality of (e.g. four at intervals of 90° in the present embodiment) spring abutment portions 11c provided at intervals in the circumferential direction to extend radially inward from the inner peripheral portion. The intermediate member 12 is an annular plate-like member, and has a plurality of (e.g. four at intervals of 90° in the present embodiment) spring abutment portions 12c provided at intervals in the circumferential direction to extend radially inward from the outer peripheral portion. The intermediate member 12 is rotatably supported by the damper hub 7, and surrounded by the drive member 11 on the radially inner side of the drive member 11.

As illustrated in FIG. 2, the driven member 15 includes an annular first driven plate 16 and an annular second driven plate 17 coupled so as to rotate together with the first driven plate 16 via a plurality of rivets (not illustrated). The first driven plate 16 is constituted as a plate-like annular member, disposed in more proximity to the turbine runner 5 than the second driven plate 17, and fixed to the damper hub 7 via a plurality of rivets together with the turbine shell 50 of the turbine runner 5. The second driven plate 17 is constituted as a plate-like annular member that has an inside diameter that is smaller than that of the first driven plate 16, and the outer peripheral portion of the second driven plate 17 is fastened to the first driven plate 16 via a plurality of rivets (not illustrated).

The first driven plate 16 has: a plurality of (e.g. four in the present embodiment) spring housing windows 16w that extend arcuately and that are disposed at intervals (equal intervals) in the circumferential direction; a plurality of (e.g. four in the present embodiment) spring support portions 16a that extend along the inner peripheral edges of the respective spring housing windows 16w and that are arranged at intervals (equal intervals) in the circumferential direction; a plurality of (e.g. four in the present embodiment) spring support portions 16b that extend along the outer peripheral edges of the respective spring housing windows 16w and that are arranged at intervals (equal intervals) in the circumferential direction to face the respective spring support portions 16a in the radial direction of the first driven plate 16; and a plurality of (e.g. four in the present embodiment) spring abutment portions 16c. The plurality of spring abutment portions 16c of the first driven plate 16 are provided such that each spring abutment portion 16c is interposed between the spring housing windows 16w (spring support portions 16a and 16b) which are adjacent to each other along the circumferential direction.

The second driven plate 17 also has: a plurality of (e.g. four in the present embodiment) spring housing windows 17w that extend arcuately and that are disposed at intervals (equal intervals) in the circumferential direction; a plurality of (e.g. four in the present embodiment) spring support portions 17a that extend along the inner peripheral edges of the respective spring housing windows 17w and that are arranged at intervals (equal intervals) in the circumferential direction; a plurality of (e.g. four in the present embodiment) spring support portions 17b that extend along the outer peripheral edges of the respective spring housing windows 17w and that are arranged at intervals (equal intervals) in the circumferential direction to face the respective spring support portions 17a in the radial direction of the second driven plate 17; and a plurality of (e.g. four in the present embodiment) spring abutment portions 17c. The plurality of spring abutment portions 17c of the second driven plate 17 are provided such that each spring abutment portion 17c is interposed between the spring support portions 17a and 17b (spring housing windows) which are adjacent to each other along the circumferential direction. In the present embodiment, as illustrated in FIG. 2, the drive member 11 is rotatably supported by the outer peripheral surface of the second driven plate 17 which is supported by the damper hub 7 via the first driven plate 16. Consequently the drive member 11 is aligned with respect to the damper hub 7.

With the damper device 10 in the attached state, the first and second springs SP1 and SP2 are each disposed between the spring abutment portions 11c of the drive member 11 which are adjacent to each other so that the first and second springs SP1 and SP2 are arranged alternately along the circumferential direction of the damper device 10. In addition, the spring abutment portions 12c of the intermediate member 12 are each provided between the first and second springs SP1 and SP2, which are disposed between the spring abutment portions 11c adjacent to each other and which are paired with each other (act in series with each other), so that the spring abutment portions 12c each abut against the end portions of such first and second springs SP1 and SP2. Consequently, with the damper device 10 in the attached state, a first end portion of each first spring SP1 abuts against the corresponding spring abutment portion 11c of the drive member 11, and a second end portion of each first spring SP1 abuts against the corresponding spring abutment portion 12c of the intermediate member 12. With the damper device 10 in the attached state, in addition, a first end portion of each second spring SP2 abuts against the corresponding spring abutment portion 12c of the intermediate member 12, and a second end portion of each second spring SP2 abuts against the corresponding spring abutment portion 11c of the drive member 11.

Meanwhile, as seen from FIG. 2, the plurality of spring support portions 16a of the first driven plate 16 each support (guide) side portions of the corresponding set of first and second springs SP1 and SP2 on the turbine runner 5 side from the inner peripheral side. In addition, the plurality of spring support portions 16b each support (guide) the side portions of the corresponding set of first and second springs SP1 and SP2 on the turbine runner 5 side from the outer peripheral side. Further, as seen from FIG. 2, the plurality of spring support portions 17a of the second driven plate 17 each support (guide) side portions of the corresponding set of first and second springs SP1 and SP2 on the lock-up piston 80 side from the inner peripheral side. In addition, the plurality of spring support portions 17b each support (guide) the side portions of the corresponding set of first and second springs SP1 and SP2 on the lock-up piston 80 side from the outer peripheral side.

In addition, with the damper device 10 in the attached state, as with the spring abutment portions 11c of the drive member 11, the spring abutment portions 16c and the spring abutment portions 17c of the driven member 15 are provided between the first and second springs SP1 and SP2, which are not paired with each other (do not act in series with each other), to abut against the end portions of such first and second springs SP1 and SP2. Consequently, with the damper device 10 in the attached state, the first end portion of each first spring SP1 also abuts against the associated spring abutment portions 16c and 17c of the driven member 15, and the second end portion of each second spring SP2 also abuts against the associated spring abutment portions 16c and 17c of the driven member 15. As a result, the driven member 15 is coupled to the drive member 11 via the plurality of first springs SP1, the intermediate member 12, and the plurality of second springs SP2, and the first and second springs SP1 and SP2 which are paired with each other are coupled in series with each other via the spring abutment portion 12c of the intermediate member 12 between the drive member 11 and the driven member 15. In the present embodiment, the distance between the axis of the starting device 1 and the damper device 10 and the axis of the first springs SP1 and the distance between the axis of the starting device 1 etc. and the axis of the second springs SP2 are equal to each other.

The damper device 10 according to the present embodiment further includes: a first stopper that restricts relative rotation between the intermediate member 12 and the driven member 15 and deflection of the second springs SP2; and a second stopper that restricts relative rotation between the drive member 11 and the driven member 15. The first stopper is configured to restrict relative rotation between the intermediate member 12 and the driven member 15 when torque transferred from the engine EG to the drive member 11 has reached torque (first threshold) T1 that is determined in advance and that is less than torque T2 (second threshold) corresponding to a maximum torsional angle of the damper device 10. In addition, the second stopper is configured to restrict relative rotation between the drive member 11 and the driven member 15 when torque transferred to the drive member 11 has reached the torque T2 corresponding to the maximum torsional angle. Consequently, the damper device 10 has damping characteristics in two stages. The first stopper may be configured to restrict relative rotation between the drive member 11 and the intermediate member 12 and deflection of the first springs SP1. The damper device 10 may also be provided with: a stopper that restricts relative rotation between the drive member 11 and the intermediate member 12 and deflection of the first springs SP1; and a stopper that restricts relative rotation between the intermediate member 12 and the driven member 15 and deflection of the second springs SP2.

Figure 3:
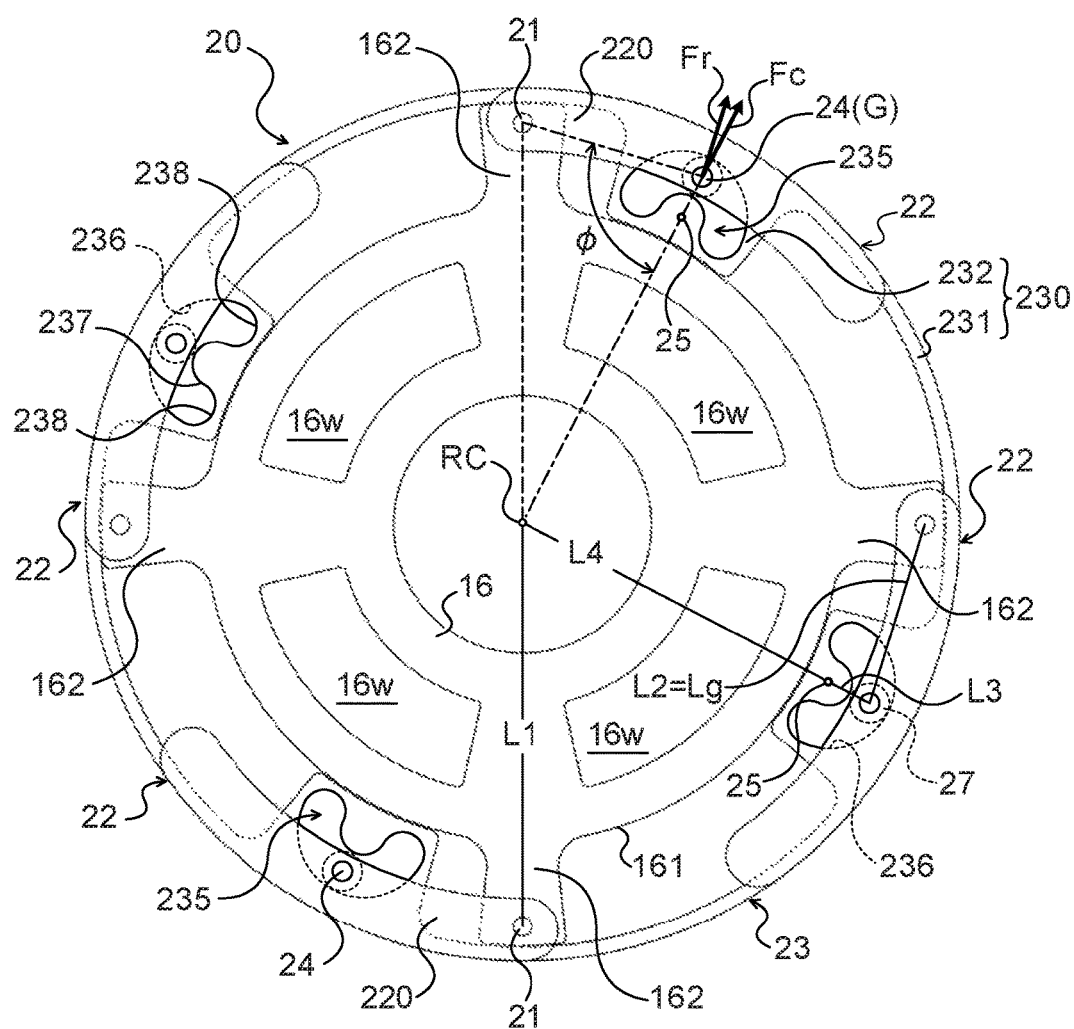
FIG. 3 is a front view of the vibration damping device according to the present disclosure.
Figure 4:
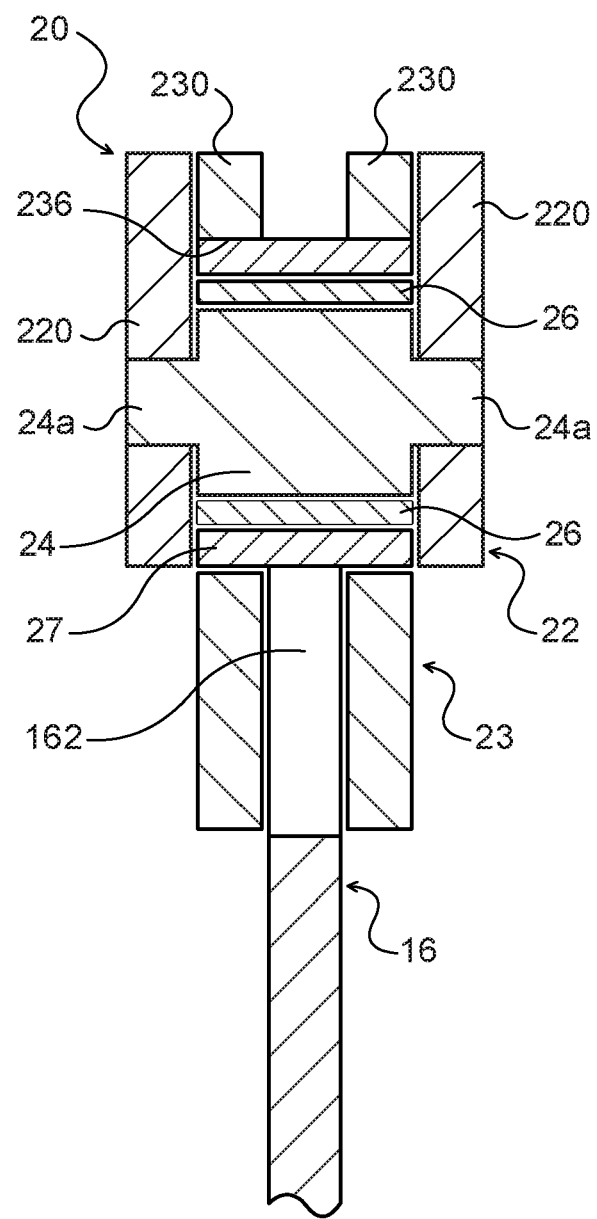
FIG. 4 is an enlarged sectional view illustrating an essential portion of the vibration damping device according to the present disclosure.

The vibration damping device 20 is coupled to the driven member 15 of the damper device 10, and disposed inside a fluid transmission chamber (oil chamber) 9 defined by the front cover 3 and the pump shell 40, which serve as a housing, and filled with working oil. As illustrated in FIGS. 2 to 4, the vibration damping device 20 includes: the first driven plate 16 which serves as a support member (first link); a plurality of (e.g. four in the present embodiment) crank members 22 that serve as a restoring force generation member (second link) rotatably coupled to the first driven plate 16 via respective first coupling shafts 21; a single annular inertial mass body (third link) 23; and a plurality of (e.g. four in the present embodiment) second coupling shafts 24 that couple the respective crank members 22 and the inertial mass body 23 so as to be rotatable relative to each other.

As illustrated in FIG. 3, the first driven plate 16 has a plurality of (e.g. four in the present embodiment) projecting support portions 162 formed at intervals (equal intervals) in the circumferential direction to project radially outward from an outer peripheral surface 161. As illustrated in the drawing, first end portions of the crank members 22 are rotatably coupled to the respective projecting support portions 162 of the first driven plate 16 via the first coupling shafts 21 (see FIG. 3). In the present embodiment, as illustrated in FIG. 4, each of the crank members 22 has two plate members 220. The plate members 220 are formed from a metal plate so as to have an arcuate planar shape. In the present embodiment, the radius of curvature of the outer peripheral edges of the plate members 220 is determined to be the same as the radius of curvature of the outer peripheral edge of the inertial mass body 23.

The two plate members 220 face each other in the axial direction of the damper device 10 via the associated projecting support portion 162 and the inertial mass body 23, and are coupled to each other via the first coupling shaft 21. In the present embodiment, the first coupling shafts 21 are each a rivet inserted through a coupling hole (circular hole) that serves as sliding bearing portion formed in the projecting support portion 162 of the first driven plate 16 and coupling holes (circular holes) that serve as sliding bearing portions formed in the plate members 220, and both ends are riveted. Consequently, the first driven plate 16 (driven member 15) and each of the crank members 22 constitute a turning pair. Each first coupling shaft 21 may be inserted through coupling holes that serve as sliding bearing portions formed in the projecting support portion 162 and one of the two plate members 220, and supported (fitted or fixed) by the other. A rolling bearing such as a ball bearing may be disposed in at least one of a space between the plate member 220 and the first coupling shaft 21 and a space between the projecting support portion 162 and the first coupling shaft 21.

The inertial mass body 23 includes two annular members 230 formed from a metal plate. The weight of the inertial mass body 23 (two annular members 230) is determined to be sufficiently larger than the weight of one crank member 22. As illustrated in FIGS. 3 and 4, the annular members 230 each have: a short cylindrical (annular) main body 231; and a plurality of (e.g. four in the present embodiment) projecting portions 232 provided at intervals (equal intervals) in the circumferential direction to project radially inward from the inner peripheral surface of the main body 231. The two annular members 230 are coupled to each other via a fixing member (not illustrated) such that the projecting portions 232 face each other in the axial direction of the annular members 230.

The projecting portions 232 are each provided with a guide portion 235 that guides the second coupling shaft 24 which couples the crank member 22 and the inertial mass body 23 to each other. The guide portion 235 is an opening portion that extends arcuately, and includes: a guide surface 236 in a recessed curved surface shape; a support surface 237 in a projecting curved surface shape provided on the inner side (a portion close to the center of the annular members 230) in the radial direction of the annular member (first driven plate 16) with respect to the guide surface 236 to face the guide surface 236; and two stopper surfaces 238 that are continuous with the guide surface 236 and the support surface 237 on both sides of the guide surface 236 and the support surface 237. The guide surface 236 is a recessed circular columnar surface that has a constant radius of curvature. The support surface 237 is a projecting curved surface that extends arcuately. The stopper surfaces 238 are each a recessed curved surface that extends arcuately. As illustrated in FIG. 3, each guide portion 235 (the guide surface 236, the support surface 237, and the stopper surfaces 238) is formed to be transversely symmetrical with respect to a line that passes through the center of curvature of the guide surface 236 and the center of the annular members 230 (center of rotation RC of the first driven plate 16). In the vibration damping device 20, a line that passes through the center of curvature of the guide surface 236 and that is orthogonal to the projecting portion 232 (annular members 230) is determined as a virtual axis (third coupling shaft) 25, the relative position of which with respect to the two annular members 230, that is, the inertial mass body 23, is invariable (which is not movable with respect to the inertial mass body 23).

The second coupling shaft 24 is formed in a solid (or hollow) round bar shape, and has two protruding portions 24a in a round bar shape, for example, that project toward the outer side in the axial direction from both ends of the second coupling shaft 24. As illustrated in FIG. 4, the two protruding portions 24a of the second coupling shaft 24 are fitted (fixed) to respective coupling holes (circular holes) formed in the plate members 220 of the crank member 22. In the present embodiment, the coupling hole of the plate member 220, with which the protruding portion 24a is fitted, is formed in the plate member 220 such that the center of the coupling hole extends coaxially with a line that passes through a center of gravity G of the crank member 22 (around the center portion of the plate member 220 in the longitudinal direction). Consequently, the length from the center of the first coupling shaft 21, which couples the first driven plate 16 (projecting support portion 162) and the crank member 22 to each other, to the center of gravity G of the crank member 22 coincides with the interaxial distance (center distance) between the first coupling shaft 21 and the second coupling shaft 24, which couples the crank member 22 and the inertial mass body 23 to each other. In addition, the other end portion of the crank member 22 (plate members 220) is positioned on the opposite side of the second coupling shaft 24 from the first coupling shaft 21. The protruding portions 24a of the second coupling shaft 24 may be inserted through coupling holes (circular holes) that serve as sliding bearing portions formed in the plate members 220 of the crank member 22. That is, the second coupling shaft 24 may be rotatably supported from both sides by the two plate members, that is, the crank member 22. Further, a rolling bearing such as a ball bearing may be disposed between the plate member 220 and the protruding portion 24a of the second coupling shaft 24.

As illustrated in FIG. 4, the second coupling shaft 24 rotatably supports a cylindrical outer ring 27 via a plurality of rollers (rolling bodies) 26. The outside diameter of the outer ring 27 is determined to be slightly smaller than the spacing between the guide surface 236 and the support surface 237 of the guide portion 235. The second coupling shaft 24 and the outer ring 27 are supported by the crank member 22, and disposed in the associated guide portion 235 of the inertial mass body 23 such that the outer ring 27 rolls on the guide surface 236. Consequently, the inertial mass body 23 is disposed coaxially with the center of rotation RC of the first driven plate 16 and so as to be rotatable about the center of rotation RC. In addition, the plurality of rollers 26, the outer ring 27, and the second coupling shaft 24 constitute a rolling bearing. Thus, relative rotation between the crank members 22 and the inertial mass body 23 is allowed, and each of the crank members 22 and the inertial mass body 23 constitute a turning pair. A plurality of balls may be disposed between the second coupling shaft 24 and the outer ring 27 in place of the plurality of rollers 26.

In the vibration damping device 20, as discussed above, the first driven plate 16 (driven member 15) and each of the crank members 22 constitute a turning pair, and each of the crank members 22 and the second coupling shaft 24 which is guided by the guide portion 235 of the inertial mass body 23 constitute a turning pair. In addition, the inertial mass body 23 is disposed so as to be rotatable about the center of rotation RC of the first driven plate 16. Consequently, when the first driven plate 16 is rotated in one direction, each of the second coupling shafts 24 is moved in conjunction with the second link while being guided by the guide portion 235 of the inertial mass body 23 to make swinging motion (reciprocal rotational motion) about the first coupling shaft 21 while keeping the interaxial distance between the first coupling shaft 21 and the second coupling shaft 24 constant, and to make swinging motion (reciprocal rotational motion) about the virtual axis 25 while keeping the interaxial distance between the virtual axis 25 and the second coupling shaft 24 constant. That is, each of the crank members 22 makes swinging motion about the first coupling shaft 21 in accordance with movement of the second coupling shaft 24, and the virtual axis 25 and the inertial mass body 23 make swinging motion about the second coupling shaft 24 which makes movement, and make swinging motion (reciprocal rotational motion) about the center of rotation RC of the first driven plate 16. As a result, the first driven plate 16, the crank members 22, the inertial mass body 23, the first and second coupling shafts 21 and 24, and the guide portions 235 substantially constitute a four-node rotary link mechanism in which the first driven plate 16 serves as a fixed node.

In the present embodiment, further, when the interaxial distance between the center of rotation RC of the first driven plate 16 and the first coupling shaft 21 is defined as "L1", the interaxial distance between the first coupling shaft 21 and the second coupling shaft 24 is defined as "L2", the interaxial distance between the second coupling shaft 24 and the virtual axis 25 is defined as "L3", and the interaxial distance between the virtual axis 25 and the center of rotation RC is defined as "L4" (see FIG. 2), the first driven plate 16, the crank members 22, the inertial mass body 23, the second coupling shafts 24, and the guide portions 235 of the inertial mass body 23 are configured to meet the relationship L1+L2>L3+L4. In the present embodiment, in addition, the interaxial distance L3 between the second coupling shaft 24 and the virtual axis 25 (the radius of curvature of the guide surface 236 minus the radius of the outer ring 27) is determined to be shorter than the interaxial distances L1, L2, and L4, and as short as possible in the range in which operation of the crank members 22 and the inertial mass body 23 is not hindered. In the present embodiment, further, the first driven plate 16 (projecting support portions 162) which serves as the first link is configured such that the interaxial distance L1 between the center of rotation RC and the first coupling shaft 21 is longer than the interaxial distances L2, L3, and L4.

Consequently, in the vibration damping device 20 according to the present embodiment, the relationship L1>L4>L2>L3 is met, and the first driven plate 16, the crank members 22, the inertial mass body 23, the first and second coupling shafts 21 and 24, and the guide portions 235 substantially constitute a double lever mechanism in which the first driven plate 16 which faces a line segment (virtual link) that connects between the second coupling shaft 24 and the virtual axis 25 serves as a fixed node. Additionally, in the vibration damping device 20 according to the present embodiment, when the length from the center of the first coupling shaft 21 to the center of gravity G of the crank member 22 is defined as "Lg", the relationship Lg=L2 is met.

In addition, the "equilibrium state (balanced state)" of the vibration damping device 20 corresponds to a state in which the resultant force of the total of centrifugal forces that act on the constituent elements of the vibration damping device 20 and forces that act on the centers of the first and second coupling shafts 21 and 24 of the vibration damping device 20 and the center of rotation RC is zero. When the vibration damping device 20 is in the equilibrium state, as illustrated in FIG. 3, the center of the second coupling shaft 24, the center of the virtual axis 25, and the center of rotation RC of the first driven plate 16 are positioned on one line. Further, the vibration damping device 20 according to the present embodiment is configured to meet $60° \leq \phi \leq 120°$, more preferably $70° \leq \phi \leq 90°$, when the angle formed by the direction from the center of the first coupling shaft 21 toward the center of the second coupling shaft 24 and the direction from the center of the second coupling shaft 24 toward the center of rotation RC of the first driven plate 16 in the equilibrium state in which the center of the second coupling shaft 24, the center of the virtual axis 25, and the center of rotation RC are positioned on one line is defined as "$\phi$".

In the starting device 1 which includes the damper device 10 and the vibration damping device 20, when lock-up is released by the lock-up clutch 8, as seen from FIG. 1, torque (power) from the engine EG which serves as a motor is transferred to the input shaft IS of the transmission TM via a path that includes the front cover 3, the pump impeller 4, the turbine runner 5, and the damper hub 7. Meanwhile, when lock-up is established by the lock-up clutch 8, as seen from FIG. 1, torque (power) from the engine EG is transferred to the input shaft IS of the transmission TM via a path that includes the front cover 3, the lock-up clutch 8, the drive member 11, the first springs SP1, the intermediate member 12, the second springs SP2, the driven member 15, and the damper hub 7.

When the drive member 11 which is coupled to the front cover 3 by the lock-up clutch 8 is rotated along with rotation of the engine EG while lock-up is established by the lock-up clutch 8, the first and second springs SP1 and SP2 act in series with each other via the intermediate member 12 between the drive member 11 and the driven member 15 until torque transferred to the drive member 11 reaches the torque T1. Consequently, torque from the engine EG transferred to the front cover 3 is transferred to the input shaft IS of the transmission TM, and fluctuations in torque from the engine EG are damped (absorbed) by the first and second springs SP1 and SP2 of the damper device 10. When torque transferred to the drive member 11 becomes equal to or more than the torque T1, meanwhile, fluctuations in torque from the engine EG are damped (absorbed) by the first springs SP1 of the damper device 10 until the torque reaches the torque T2.

Figure 5A:
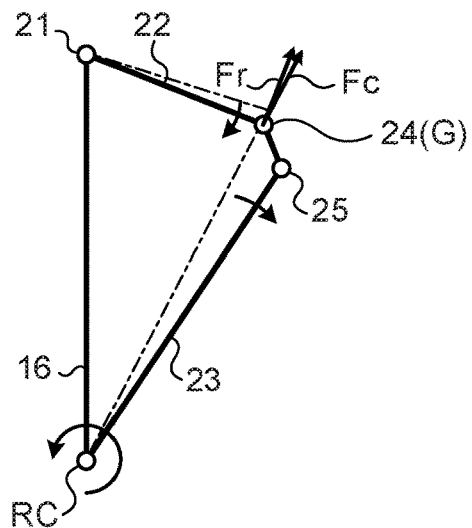
FIG. 5A is a schematic diagram illustrating operation of the vibration damping device according to the present disclosure.
Figure 5B:
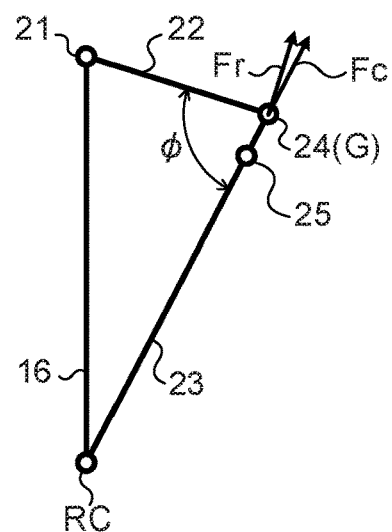
FIG. 5B is a schematic diagram illustrating operation of the vibration damping device according to the present disclosure.
Figure 5C:
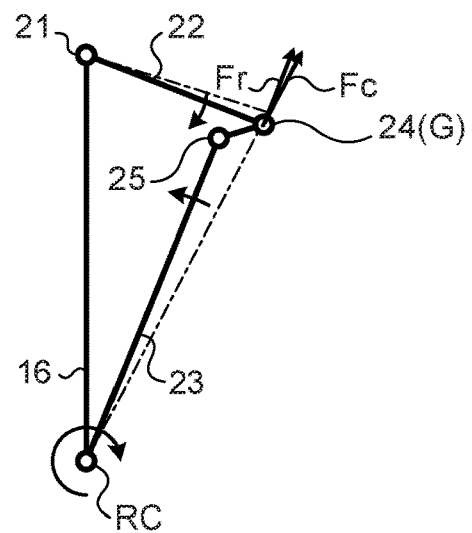
FIG. 5C is a schematic diagram illustrating operation of the vibration damping device according to the present disclosure.

In the starting device 1, further, when the damper device 10, which is coupled to the front cover 3 by the lock-up clutch 8 along with establishment of lock-up, is rotated together with the front cover 3, the first driven plate 16 (driven member 15) of the damper device 10 is also rotated in the same direction as the front cover 3 about the axis of the starting device 1. Along with rotation of the first driven plate 16, the crank members 22 and the inertial mass body 23 which constitute the vibration damping device 20 are swung with respect to the first driven plate 16 as illustrated in FIGS. 5A, 5B, and 5C. Consequently, it is possible to damp vibration of the first driven plate 16 by applying vibration that is opposite in phase to vibration transferred from the engine EG to the drive member 11 from the inertial mass body 23 which is swung to the first driven plate 16 via the second coupling shafts 24 and the crank members 22. That is, the vibration damping device 20 is configured to have an order that matches the order (excitation order: 1.5th order in the case where the engine EG is e.g. a three-cylinder engine, and second order in the case where the engine EG is e.g. a four-cylinder engine) of vibration transferred from the engine EG to the first driven plate 16, and damps vibration transferred from the engine EG to the first driven plate 16 irrespective of the rotational speed of the engine EG (first driven plate 16). Consequently, it is possible to damp vibration significantly well using both the damper device 10 and the vibration damping device 20 while suppressing an increase in weight of the damper device 10.

In the vibration damping device 20, a four-node rotary link mechanism can be constituted without using a link coupled to both the crank members 22 and the inertial mass body 23, that is, a connecting rod in a common four-node rotary link mechanism. Thus, in the vibration damping device 20, it is not necessary to secure the strength or the durability of the connecting rod by increasing the thickness or the weight, and thus it is possible to suppress an increase in weight or size of the entire device well. In the vibration damping device 20 which does not include a connecting rod, additionally, the vibration damping performance can be secured well by suppressing a reduction in restoring force that acts on the crank member 22 that is attributable to movement of the center of gravity G of the crank member 22 toward the center of rotation RC due to an increase in weight (moment of inertia) of the connecting rod.

Meanwhile, it is not necessary to provide a bearing such as a sliding bearing or a rolling bearing on the virtual axis 25 of the vibration damping device 20, and thus it is possible to easily shorten the interaxial distance L3 between the second coupling shaft 24 and the virtual axis 25 by improving the degree of freedom in setting of the interaxial distance L3, that is, the length of the connecting rod in the common four-node rotary link mechanism. Thus, the vibration damping performance of the vibration damping device 20 can be improved easily by adjusting the interaxial distance L3. Further, a link (connecting rod) coupled to both the crank member 22 and the inertial mass body 23 is not required, and thus a component force of a centrifugal force Fc that acts on the crank member 22 is not used to return the link which is coupled to both the crank member 22 and the inertial mass body 23 to the position in the equilibrium state. Thus, the vibration damping performance of the vibration damping device 20 can be improved while an increase in weight of the crank member 22 is suppressed. As a result, with the vibration damping device 20, it is possible to further improve the vibration damping performance while suppressing an increase in weight or size of the entire device.

Next, the procedure for designing the vibration damping device 20 will be described.

A device obtained by omitting a connecting rod and an inertial mass body from the vibration damping device 20 discussed above is considered to correspond to a centrifugal-pendulum vibration absorbing device. In the centrifugal-pendulum vibration absorbing device, the vibration angle of a pendulum mass body becomes larger along with an increase in amplitude of vibration of input torque transferred to a support member for the pendulum mass body, and a restoring force that acts to return the pendulum mass body to an equilibrium state (balanced position) becomes smaller as the vibration angle becomes larger. Therefore, when the amount of decrease in the restoring force, that is, the equivalent rigidity of the centrifugal-pendulum vibration absorbing device, with respect to the amount of variation in the moment of inertia of the pendulum mass body, that is, the equivalent mass of the centrifugal-pendulum vibration absorbing device, becomes larger, the effective order, which is the order of vibration that may be best damped by the centrifugal-pendulum vibration absorbing device, becomes lower as the vibration angle of the pendulum mass body becomes larger. The vibration damping performance of the centrifugal-pendulum vibration absorbing device is degraded as the amount of decrease in effective order (difference from the excitation order) becomes larger. Thus, the centrifugal-pendulum vibration absorbing device is generally designed such that the amount of decrease in effective order when the vibration angle becomes larger is as small as possible.

In the vibration damping device 20 discussed above, in contrast, when an amplitude λ of vibration of torque (hereinafter referred to as "input torque") transferred from the drive member 11 to the driven member 15 becomes larger and the vibration angle of the inertial mass body 23 becomes larger, a deviation is caused between the order of vibration that should originally be damped by the vibration damping device 20, that is, an excitation order $q_{tag}$ of the engine EG, and an effective order $q_{eff}$ which is the order of vibration best damped by the vibration damping device 20. That is, with the vibration damping device 20, the effective order $q_{eff}$ may become lower or higher than the excitation order $q_{tag}$ of the engine EG, depending on the specifications of the vibration damping device, as the vibration angle of the inertial mass body 23, that is, the amplitude λ of vibration of the input torque, becomes larger.

Thus, the inventors first made a simulation to search for a combination of the interaxial distances L2, L3, and L4 and the length Lg (length from the center of the first coupling shaft 21 to the center of gravity G of the crank member 22) that did not vary the effective order $q_{eff}$ even if the amplitude λ of vibration of the input torque was varied with a mass m of the crank member 22, a moment of inertia J of the inertial mass body 23, the number of cylinders n of the engine EG, the interaxial distance L1 which depends on the requirement for mounting of the vibration damping device 20, and so forth kept constant. In the simulation, when a state in which the inertial mass body 23 had been rotated by a certain initial angle (an angle corresponding to the vibration angle of the inertial mass body 23 about the center of rotation RC) about the center of rotation RC from the position in the equilibrium state was defined as an initial state in a plurality of models of the vibration damping device 20 with different interaxial distances L2, L3, and L4 and length Lg, torque that did not contain a vibration component was applied to the first driven plate 16 for each of a plurality of initial angles to rotate the first driven plate 16 at a constant rotational speed (e.g. 1000 rpm) to swing the inertial mass body 23 etc. at a frequency that matched the initial angle. The plurality of models used in the simulation had each been prepared to damp vibration with an excitation order $q_{tag}$=1.5 from three-cylinder engines. In the simulation, the effects of a centrifugal hydraulic pressure that acted on the crank member 22 etc. in the fluid transmission chamber 9 and friction between the members were ignored.

As a result of the simulation, it was revealed that the effective order $q_{eff}$ was kept generally constant even if the amplitude λ of vibration of the input torque was varied in the case where the relationship of the following formula (1) was established in the vibration damping device 20. It should be noted, however, that "α", "β", and "γ" in the formula (1) are each a constant determined through simulation. As a result of the analysis conducted by the inventors, in addition, it was also revealed that the effective order $q_{eff}$ became higher as the amplitude λ of vibration of the input torque became larger in the case where the relationship of the following formula (2) was established in the vibration damping device 20, and that the effective order $q_{eff}$ became lower as the amplitude λ of vibration of the input torque became larger in the case where the relationship of the following formula (3) was established in the vibration damping device 20. As a result of the analysis, further, it was revealed that a convergence value (hereinafter referred to as a "reference order $q_{ref}$") of the effective order $q_{eff}$ when the amplitude λ of vibration of the input torque became smaller was varied by varying the mass m of the crank member 22 and the moment of inertia J of the inertial mass body 23 in the vibration damping device 20 which met any of the formulae (1), (2), and (3). In this case, the reference order $q_{ref}$ is higher as the mass m of the crank member 22 is smaller, and is higher as the moment of inertia J of the inertial mass body 23 is larger.

$$L4/(L3+L4)=\alpha \cdot (Lg/L2)+\beta \cdot n+\gamma \tag{1}$$

$$L4/(L3+L4)>\alpha \cdot (Lg/L2)+\beta \cdot n+\gamma \tag{2}$$

$$L4/(L3+L4)<\alpha \cdot (Lg/L2)+\beta \cdot n+\gamma \tag{3}$$

Further, the inventors examined the relationship between the reference order $q_{ref}$ and the vibration damping performance of the vibration damping device 20 on the basis of the results of the simulation and the analysis discussed above. Here, the relationship between the rotational speed Ne of the engine EG (which is a three-cylinder engine) and the torque fluctuations $T_{Fluc}$ of the final vibration suppression target (which is the drive shafts DS) was evaluated through numerical analysis using an LMS Imagine.Lab Amesim (registered trademark) manufactured by Siemens AG for a plurality of models of the vibration damping device 20 prepared so as to have the same proportion p of the amount of deviation of the effective order $q_{eff}$ from the excitation order $q_{tag}$ with respect to the excitation order $q_{tag}$ and different values of the reference order $q_{ref}$. The amount of deviation of the effective order $q_{eff}$ from the excitation order $q_{tag}$ is obtained by subtracting the excitation order $q_{tag}$ from the effective order $q_{eff}$ when the amplitude λ of vibration of the input torque is maximum and the vibration angle of the inertial mass body 23 is maximum.

The LMS Imagine.Lab Amesim used in the analysis derives equations for rotary elements included in the input dynamic model and solving simultaneous equations constituted from a group of the derived equations through substitution of design parameters of the dynamic model input separately, and thereby calculate, for each of the rotary elements of the dynamic model, a response (an angle, i.e. a rotational displacement, per time) when an external force acts and then calculates transferred torque from the calculated response and the rigidities of components before and after the rotary element. The dynamic model used in the analysis is a dynamic model that simulates a vehicle structure (see FIG. 1) from the engine EG to wheels W, including the vibration damping device 20 and the final vibration suppression target (which is the drive shafts DS), and a dynamic model with multiple degrees of freedom prepared in consideration of non-linearity of the vibration suppression target and the vibration damping device 20. In the analysis, in addition, a moment of inertia $J_1$ of the driven member 15, a moment of inertia $J_2$ of the inertial mass body 23, the interaxial distances L3 and L4, and the mass m of all the crank members 22, of the design parameters of the dynamic model were varied as appropriate in consideration of the mountability of the vibration damping device 20 to the starting device 1 (vehicle) etc., so that the values of the reference order $q_{ref}$ were made different from each other among the plurality of models of the vibration damping device 20. That is, in the analysis, parameters other than the moments of inertia $J_1$ and $J_2$, the interaxial distances L3 and L4, and the mass m, among the design parameters of the dynamic model, were fixed values.

Figure 6:
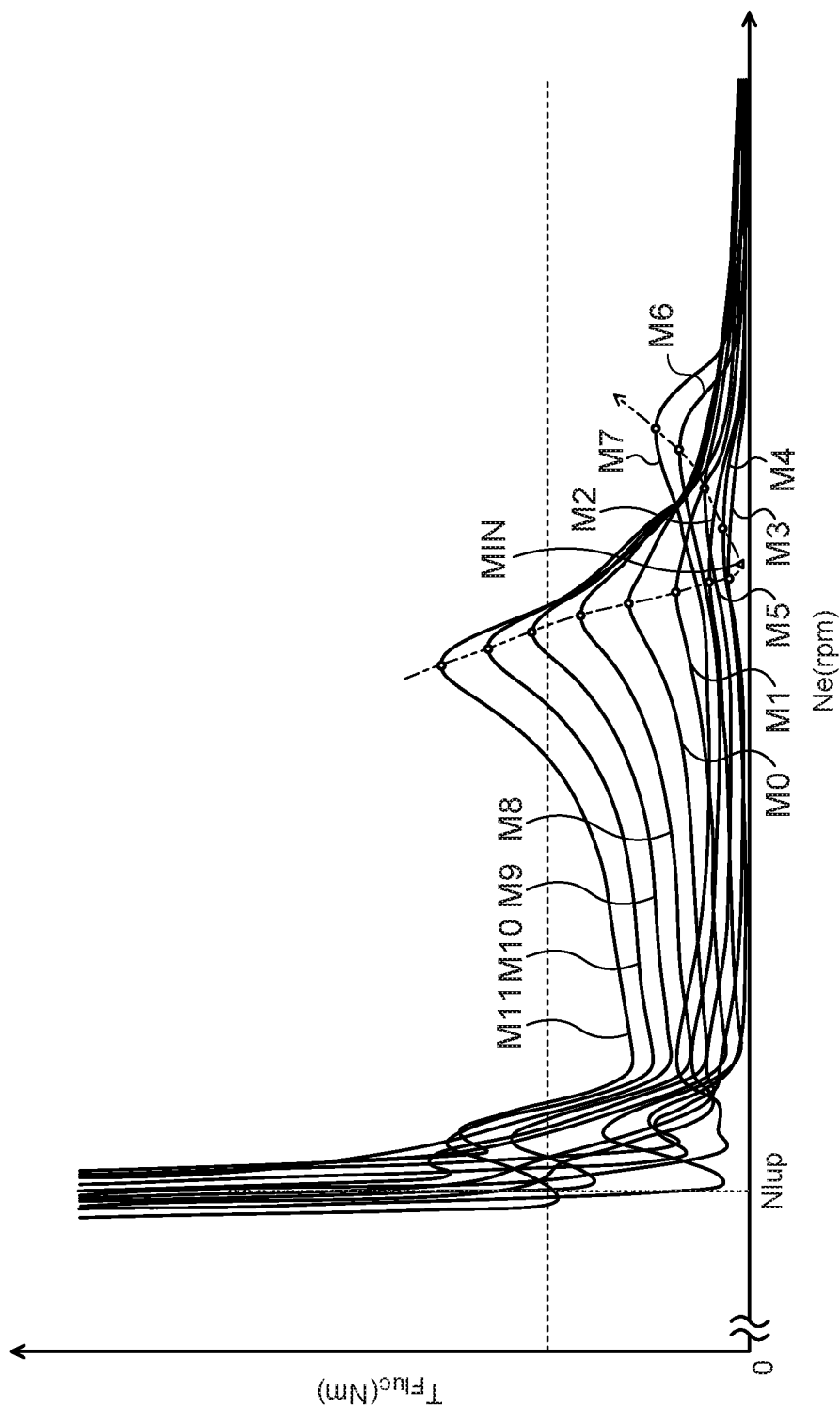
FIG. 6 illustrates an example of the relationship between the rotational speed of an engine and torque fluctuations $T_{Fluc}$ of an output element of a damper device according to the present disclosure.

FIG. 6 illustrates the results of analyzing the relationship between the rotational speed Ne and the torque fluctuations $T_{Fluc}$ of the drive shafts DS for a plurality of models M0 to M11 of the vibration damping device 20 that have different values of the reference order $q_{ref}$. The drawing illustrates the results of analyzing the torque fluctuations $T_{Fluc}$ (vibration level) of the drive shafts DS in a state in which torque is transferred from the engine EG to the driven member 15 through execution of lock-up.

The model M0 in FIG. 6 is a model of the vibration damping device 20 for which the moment of inertia $J_1$ of the driven member 15, the moment of inertia $J_2$ of the inertial mass body 23, the interaxial distances L3 and L4, and the mass m of all the crank members 22 are determined such that the reference order $q_{ref}$ coincides with the excitation order $q_{tag}$ (=1.5). The models M1 to M7 are models for which the moments of inertia $J_1$ and $J_2$, the interaxial distances L3 and L4, and the mass m are determined such that the reference order $q_{ref}$ is increased by a value of 0.005 each. That is, the reference order $q_{ref}$ of the model M1 is determined as $q_{ref}$=1.505, the reference order $q_{ref}$ of the model M2 is determined as $q_{ref}$=1.510, the reference order $q_{ref}$ of the model M3 is determined as $q_{ref}$=1.515, the reference order $q_{ref}$ of the model M4 is determined as $q_{ref}$=1.520, the reference order $q_{ref}$ of the model M5 is determined as $q_{ref}$=1.525, the reference order $q_{ref}$ of the model M6 is determined as $q_{ref}$=1.530, and the reference order $q_{ref}$ of the model M7 is determined as $q_{ref}$=1.535. In addition, the models M8 to M11 are models for which the moments of inertia $J_1$ and $J_2$, the interaxial distances L3 and L4, and the mass m are determined such that the reference order $q_{ref}$ is decreased by a value of 0.005 each. That is, the reference order $q_{ref}$ of the model M8 is determined as $q_{ref}$=1.495, the reference order $q_{ref}$ of the model M9 is determined as $q_{ref}$=1.490, the reference order $q_{ref}$ of the model M10 is determined as $q_{ref}$=1.485, and the reference order $q_{ref}$ of the model M11 is determined as $q_{ref}$=1.480.

Further, the moments of inertia $J_1$ and $J_2$, the interaxial distances L3 and L4, and the mass m of the models M0 to M11 were determined such that the effective order $q_{eff}$ became gently higher as the amplitude X of vibration of input torque transferred from the engine EG to the driven member 15 became larger (e.g. such that the proportion p was a constant value of about 10%) in accordance with the above formula (2). In addition, the reference order $q_{ref}$ was varied among the models M0 to M11 by keeping the moment of inertia $J_1$ of the driven member 15, the interaxial distances L3 and L4, and the mass m of the crank member 22 constant and varying the moment of inertia $J_2$ of the inertial mass body 23. It should be noted, however, that the reference order $q_{ref}$ may be adjusted by keeping the moments of inertia $J_1$ and $J_2$ and the interaxial distances L3 and L4 constant and varying the mass m of the crank members 22 as discussed above.

As seen from FIG. 6, for the models M9, M10, and M11, in which the reference order $q_{ref}$ was lower than the excitation order $q_{tag}$, the torque fluctuations $T_{Fluc}$ of the drive shafts DS around the lock-up rotational speed Nlup of the lock-up clutch 8 exceeded an allowable value indicated by the broken line in the drawing, and the peak values (see the round marks in the drawing) of the torque fluctuations $T_{Fluc}$ in a predetermined rotational speed range (e.g. 1000 to 2000 rpm) of the lock-up region also exceeded the allowable value. For the model M8, in which the reference order $q_{ref}$ was slightly lower than the excitation order $q_{tag}$, in addition, the peak value of the torque fluctuations $T_{FLuc}$ in the predetermined rotational speed range of the lock-up region fell below the allowable value, but the torque fluctuations $T_{Fluc}$ of the drive shafts DS around the lock-up rotational speed Nlup exceeded the allowable value. For the models M1 to M7, for which the reference order $q_{ref}$ was lower than the excitation order $q_{tag}$, in contrast, the torque fluctuations $T_{Fluc}$ of the drive shafts DS around the lock-up rotational speed Nlup were sufficiently small to be less than those for the model M0, for which the allowable value and the proportion ρ were 0%, and the peak value of the torque fluctuations $T_{Fluc}$ in the predetermined rotational speed range of the lock-up region was also sufficiently small.

From such analysis results, it is understood that the vibration damping performance of the vibration damping device 20, which includes the crank members 22 and the inertial mass body 23 which is swung in conjunction with the crank members 22, may be further improved by making the reference order $q_{ref}$, which is a convergence value of the effective order $q_{eff}$ when the amplitude λ of vibration of the input torque becomes smaller, higher than the excitation order $q_{tag}$ of the engine EG, rather than by causing the reference order $q_{eff}$ to coincide with the excitation order $q_{tag}$. In the light of this, the vibration damping device 20 according to the present embodiment is designed such that the reference order $q_{ref}$ is higher than the excitation order $q_{tag}$ of the engine EG.

Figure 7:
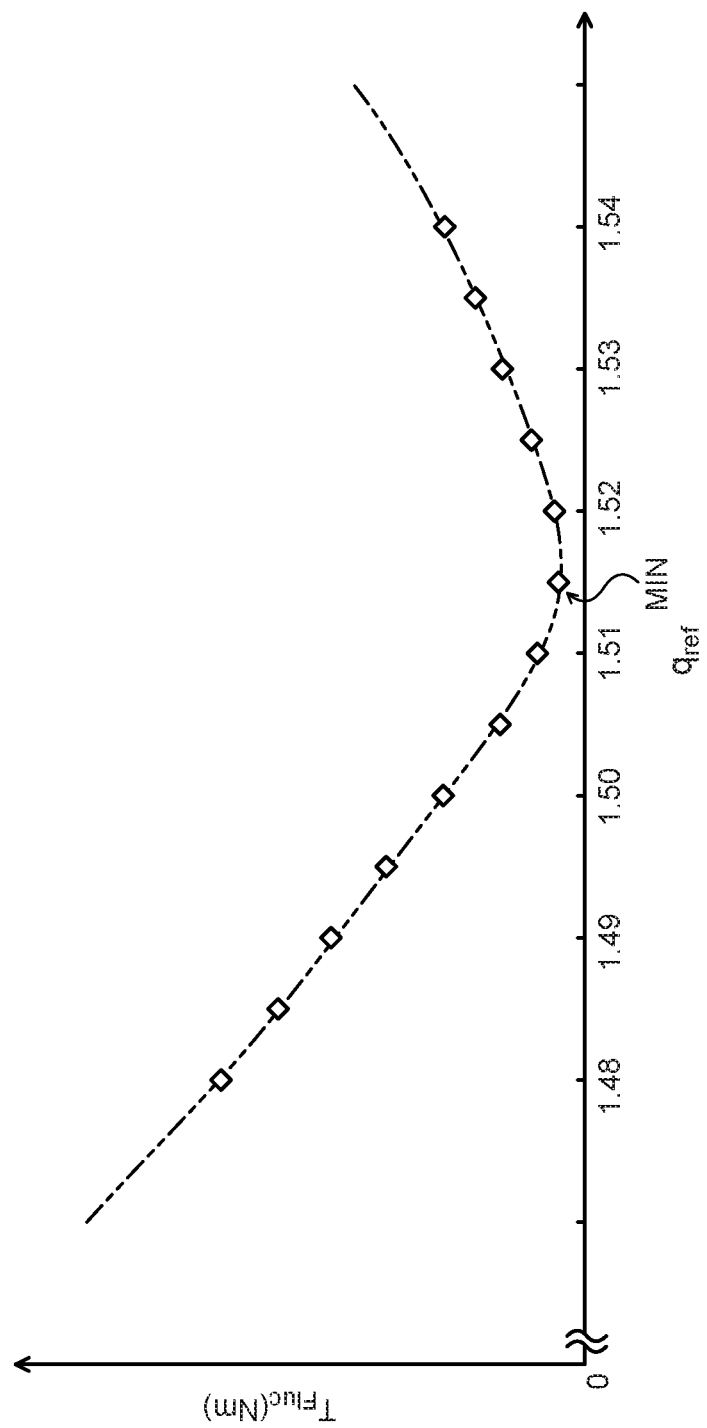
FIG. 7 illustrates an example of the relationship between a reference order $q_{ref}$ and the torque fluctuations $T_{Fluc}$ of the output element of the damper device according to the present disclosure.

As indicated in FIG. 7 (and by the dash-double-dot line in FIG. 6), in addition, when the model M0, the reference order $q_{ref}$ of which coincides with the excitation order $q_{tag}$ (=1.50), is used as the base point, the peak value of the torque fluctuations $T_{Fluc}$ in the predetermined rotational speed range of the lock-up region is larger as the reference order $q_{ref}$ is lower. As indicated in FIG. 7 (and by the dash-doubledot line in FIG. 6), further, when the model M0 is used as the base point, the peak value of the torque fluctuations $T_{Fluc}$ in the lock-up region is temporarily decreased and thereafter shifts to being increased by way of a minimum value MIN along with an increase in reference order $q_{ref}$ in the case where the reference order $q_{ref}$ is higher than the excitation order $q_{tag}$. Thus, in the light of such a tendency, the vibration damping device 20 is preferably designed so as to meet $1.00 \times q_{tag} < q_{ref} \leq 1.03 \times q_{tag}$, more preferably $1.01 \times q_{tag} \leq q_{ref} \leq 1.02 \times q_{tag}$. Consequently, it is possible to improve the vibration damping performance of the vibration damping device 20, which includes the crank members 22 and the inertial mass body 23 which is swung in conjunction with the crank members 22, significantly well by bringing the peak value of the torque fluctuations $T_{Fluc}$ in the predetermined rotational speed range of the lock-up region closer to a value around the minimum value MIN (target range).

Figure 8:
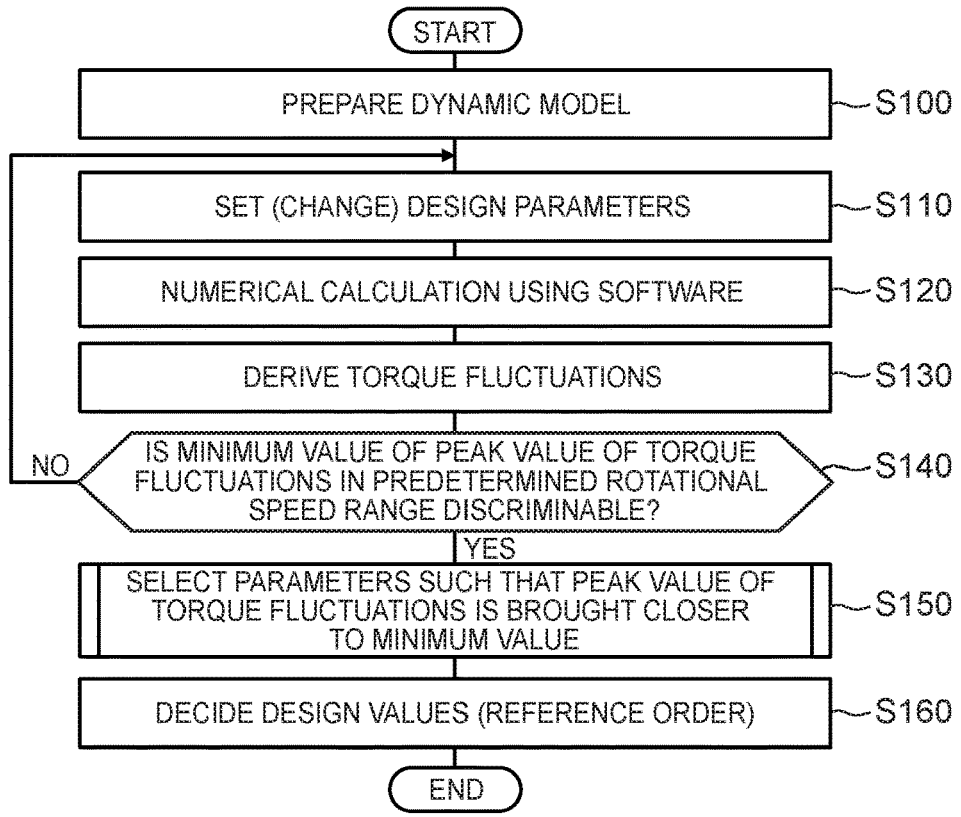
FIG. 8 is a flowchart illustrating an example of the procedure for designing the vibration damping device according to the present disclosure.

In order to make the reference order $q_{ref}$ higher than the excitation order $q_{tag}$ and bring the peak value of the torque fluctuations $T_{Fluc}$ in the predetermined rotational speed range closer to the minimum value MIN, the vibration damping device 20 may be designed through the procedure illustrated in FIG. 8. That is, in designing the vibration damping device 20, first, a dynamic model such as that discussed above that simulates a vehicle structure from the engine EG to the wheels W, including the vibration damping device 20 and the final vibration suppression target, is prepared (step S100). Next, the moments of inertia $J_1$ and $J_2$, the interaxial distances L3 and L4, and the mass m are set as design parameters that cause the reference order $q_{ref}$ to coincide with the excitation order $q_{tag}$, or that make the reference order $q_{ref}$ slightly higher than the excitation order $q_{tag}$, for example (step S110). Further, numerical calculation (calculation of the response discussed above) is executed using software such as the LMS Imagine.Lab Amesim for the design parameters set in step S110 (step S120), and the torque fluctuations $T_{Fluc}$ of the drive shafts DS as the vibration suppression target are derived (S130).

After the processing in step S130, it is determined whether or not a minimum value MIN of the peak value of the torque fluctuations $T_{Fluc}$ in a predetermined rotational speed range (e.g. 1000 to 2000 rpm) is discriminable, that is, whether or not the peak value of the torque fluctuations $T_{FLuc}$ has shifted from decreasing to increasing (step S140). In the case where it is determined in step S140 that a minimum value MIN of the peak value of the torque fluctuations $T_{Fluc}$ is not discriminable, the processing returns to step S110, and the moments of inertia $J_1$ and $J_2$, the interaxial distances L3 and L4, and the mass m which serve as the design parameters are reset (changed) such that the reference order $q_{ref}$ becomes higher than the reference order $q_{ref}$ determined from the design parameters set in the preceding step S110. In this event, as discussed above, only the moment of inertia $J_2$ or the mass m may be varied in order to make the reference order $q_{ref}$ higher. After the design parameters are reset in this way, the processing in steps S120 to S140 discussed above is executed again. That is, the processing in steps S120 and S130 is repeatedly executed while the design parameters are set (changed) such that the reference order $q_{ref}$ becomes higher in step S110 until it is determined in step S140 that a minimum value MIN of the peak value of the torque fluctuations $T_{Fluc}$ is discriminable.

If it is determined in step S140 that a minimum value MIN of the peak value of the torque fluctuations $T_{Fluc}$ is discriminable, the design parameters, that is, the moments of inertia $J_1$ and $J_2$, the interaxial distances L3 and L4, and the mass m, are selected so as to bring the peak value of the torque fluctuations $T_{Fluc}$ into a target range, that is, so as to bring the peak value closer to the minimum value MIN or bring the peak value to the minimum value MIN (step S150). In step S150, a search may be made for such design parameters that bring the peak value of the torque fluctuations $T_{Fluc}$ in the predetermined rotational speed range closer to the minimum value MIN, or that bring such a peak value to a value around the minimum value MIN, by deriving the torque fluctuations $T_{Fluc}$ in the same manner as in steps S120 and S130 while the design parameters (e.g. the moment of inertia $J_2$ or the mass m) are changed such that the reference order $q_{ref}$ becomes higher than the reference order $q_{ref}$ determined from the design parameters immediately before the peak value of the torque fluctuations $T_{Fluc}$ shifts to being increased, for example. By deciding the thus selected values of the design parameters, that is, the moments of inertia $J_1$ and $J_2$, the interaxial distances L3 and L4, and the mass m, as design values (step S160), design for making the reference order $q_{ref}$ higher than the excitation order $q_{tag}$ and bringing the peak value of the torque fluctuations $T_{Fluc}$ closer to the minimum value MIN is completed. The reference order $q_{ref}$ of the vibration damping device 20 is determined in accordance with the values of the moments of inertia $J_1$ and $J_2$, the interaxial distances L3 and L4, and the mass m determined as design values.

In the present embodiment, the effective order $q_{eff}$ is determined to be larger than the sum of the excitation order $q_{tag}$ of the engine EG and an offset value $\Delta q$ determined in consideration of the effect of working oil in the fluid transmission chamber 9. The experiments and the analyses conducted by the inventors revealed that the offset value $\Delta q$ had a value in the range of $0.05 \times q_{tag} < \Delta q \leq 0.20 \times q_{tag}$ although the value was fluctuated in accordance with the torque ratio or the torque capacity of the starting device 1 (fluid transmission apparatus), the capacity of the fluid transmission chamber 9, etc. In step S110 of FIG. 8, design parameters may be set (changed) automatically by software, separately set design parameters may be input to software, and a plurality of sets of design parameters ($J_1$, $J_2$, L3, L4, m) set in advance such that the reference order $q_{ref}$ becomes higher may be set sequentially as parameters for use in numerical analysis. In step S150 of FIG. 8, in addition, design parameters for bringing the peak value of the torque fluctuations $T_{Fluc}$ to a value around the minimum value MIN may be determined in consideration of the mountability of the vibration damping device 20 to the starting device 1 (vehicle) etc. from the design parameters immediately before the peak value of the torque fluctuations $T_{Fluc}$ shifts to being increased and the design parameters when the peak value shifts to being increased. Further, a plurality of design parameters, with which the peak value of the torque fluctuations $T_{Fluc}$ in a predetermined rotational speed range derived in step S130 of FIG. 8 is included in a predetermined target range (allowable range, which is around the minimum value MIN in FIG. 7), may be extracted, and one of the plurality of design parameters that minimizes the peak value of the torque fluctuations $T_{Fluc}$ may be selected as a design value. In any case, the target range may be determined to be smaller than the torque fluctuations $T_{Fluc}$ of the vibration suppression target (drive shafts DS) when the reference order $q_{ref}$ coincides with the excitation order $q_{tag}$ of the engine EG.

In step S100 of FIG. 8, in addition, the moments of inertia $J_1$ and $J_2$, the interaxial distances L3 and L4, and the mass m which serve as the design parameters may be set such that the effective order $q_{eff}$ becomes gently higher as the amplitude $\lambda$ of vibration of input torque transferred from the engine EG to the driven member 15 becomes larger in accordance with the above formula (2). That is, by designing the vibration damping device 20 such that the effective order $q_{eff}$ becomes higher as the amplitude λ of vibration of input torque transferred from the engine EG to the driven member 15 becomes larger using the above formula (2), it is possible to shift a region in which the vibration damping performance is reduced because of a deviation of the effective order $q_{eff}$ toward the high rotation side even if there occurs a deviation of the effective order $q_{eff}$ as the amplitude λ becomes larger. As a result, a reduction in vibration damping performance due to a deviation of the effective order $q_{eff}$ in a region of the lock-up region in which the rotational speed Ne is relatively low can be suppressed, which makes it possible to further improve the vibration damping performance in a region in which the rotational speed Ne of the engine EG is low.

It should be noted, however, that the vibration damping device 20 may be designed such that the effective order $q_{eff}$ is not varied even if the amplitude λ of vibration of the input torque transferred from the engine EG to the driven member 15 is varied (such that the above proportion is 0%). Also in this case, it is possible to further improve the vibration damping performance in a region in which the rotational speed Ne of the engine EG is low by suppressing a reduction in vibration damping performance due to a deviation of the effective order $q_{eff}$ in a region of the lock-up region in which the rotational speed Ne is relatively low. In this case, additionally, a reduction in vibration damping performance due to a deviation of the effective order $q_{eff}$ can be suppressed well while an increase in moment of inertia J of the inertial mass body 23 and a reduction in durability that accompanies a reduction in weight of the crank member 22 are suppressed. As a result, it is possible to improve the vibration damping performance and to reduce the size of the vibration damping device 20 and improve the durability thereof.

Figure 9:
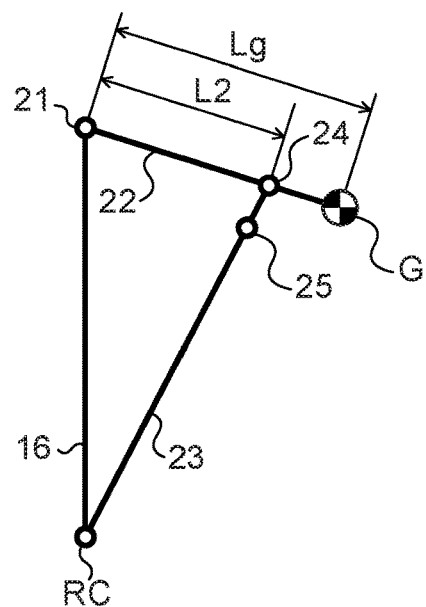
FIG. 9 is a schematic diagram illustrating still another vibration damping device according to the present disclosure.

Further, the vibration damping device 20 may be configured so as to meet the relationship Lg>L2 as illustrated in FIG. 9. Consequently, although the load which acts on the support portion (bearing portion) of the first coupling shaft 21 is increased compared to a case where the relationship Lg=L2 is met, it is possible to further increase the restoring force Fr which acts on the crank member 22 using leverage. In this case, the center of gravity G does not necessarily need to be positioned on a line that passes through the centers of the first and second coupling shafts 21 and 24.

Figure 10:
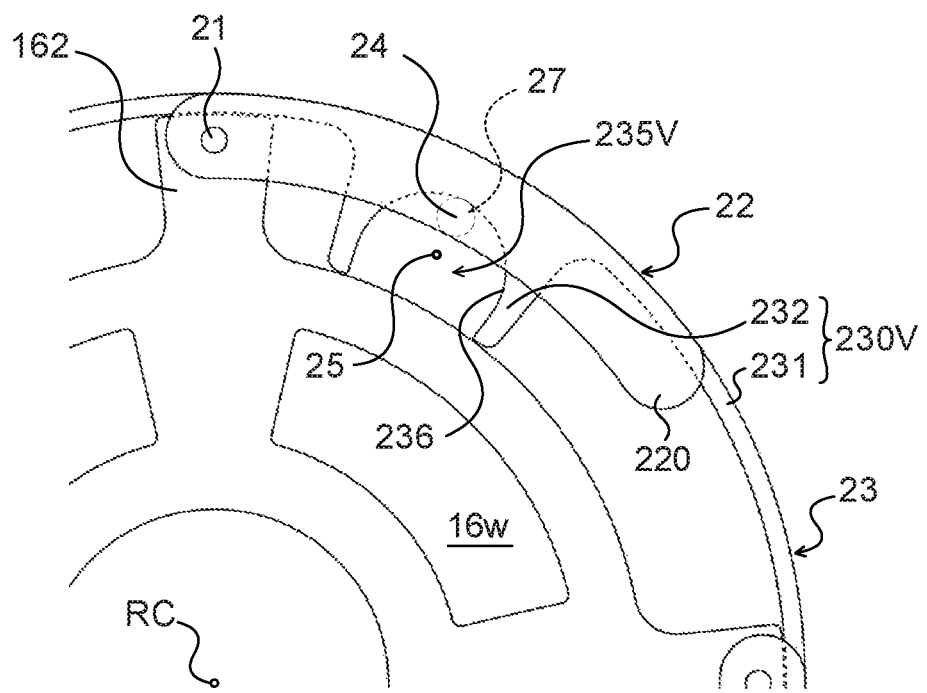
FIG. 10 is a schematic diagram illustrating another vibration damping device according to the present disclosure.

In addition, the guide portions 235 may be formed in the crank members 22, and the second coupling shafts 24 may be supported by the inertial mass body 23. Further, the guide portion 235 includes the support surface 237 in a projecting curved surface shape which faces the guide surface 236 and the stopper surfaces 238. As illustrated in FIG. 10, however, the support surface 237 and the stopper surfaces 238 may be omitted. A guide portion 235V formed in the projecting portion 232 of an annular member 230V illustrated in FIG. 10 is a generally semi-circular notch that has the guide surface 236 in a recessed curved surface shape (recessed circular columnar surface shape) that has a constant radius of curvature. Consequently, it is possible to simplify the structure of the guide portion 235V which guides the second coupling shaft 24, and hence the structure of the vibration damping device 20. In addition, a guide portion that is similar to the guide portion 235V may be formed in the plate members 220 of the crank member 22. Additionally, the guide surface 236 may be a recessed curved surface formed such that the radius of curvature is varied stepwise or gradually, for example, as long as the second coupling shaft 24 is moved as discussed above.

Further, the annular inertial mass body 23 may be configured to be rotatably supported (aligned) by the first driven plate 16. Consequently, it is possible to smoothly swing the inertial mass body 23 about the center of rotation RC of the first driven plate 16 when the crank members 22 are swung.

In the vibration damping device 20, in addition, the inertial mass body 23 which is annular may be replaced with a plurality of (e.g. four) mass bodies that have the same specifications (such as dimensions and weight) as each other. In this case, the mass bodies may be constituted from metal plates that have an arcuate planar shape, for example, and that are coupled to the first driven plate 16 via the crank member 22 (two plate members 220), the second coupling shaft 24, and the guide portion 235 so as to be arranged at intervals (equal intervals) in the circumferential direction in the equilibrium state and swing about the center of rotation RC. In this case, guide portions that guide the mass bodies so as to swing about the center of rotation RC while receiving a centrifugal force (centrifugal hydraulic pressure) that acts on the mass bodies may be provided in the outer peripheral portion of the first driven plate 16.

Further, the vibration damping device 20 may include a dedicated support member (first link) that constitutes a turning pair with the crank member 22 by swingably supporting the crank member 22 and that constitutes a turning pair with the inertial mass body 23. That is, the crank member 22 may be coupled to a rotary element indirectly via a dedicated support member that serves as the first link. In this case, it is only necessary that the support member of the vibration damping device 20 should be coupled so as to rotate coaxially and together with a rotary element, such as the drive member 11, the intermediate member 12, or the first driven plate 16 of the damper device 10, for example, vibration of which is to be damped. Also with the thus configured vibration damping device 20, it is possible to damp vibration of the rotary element well.

Figure 11:
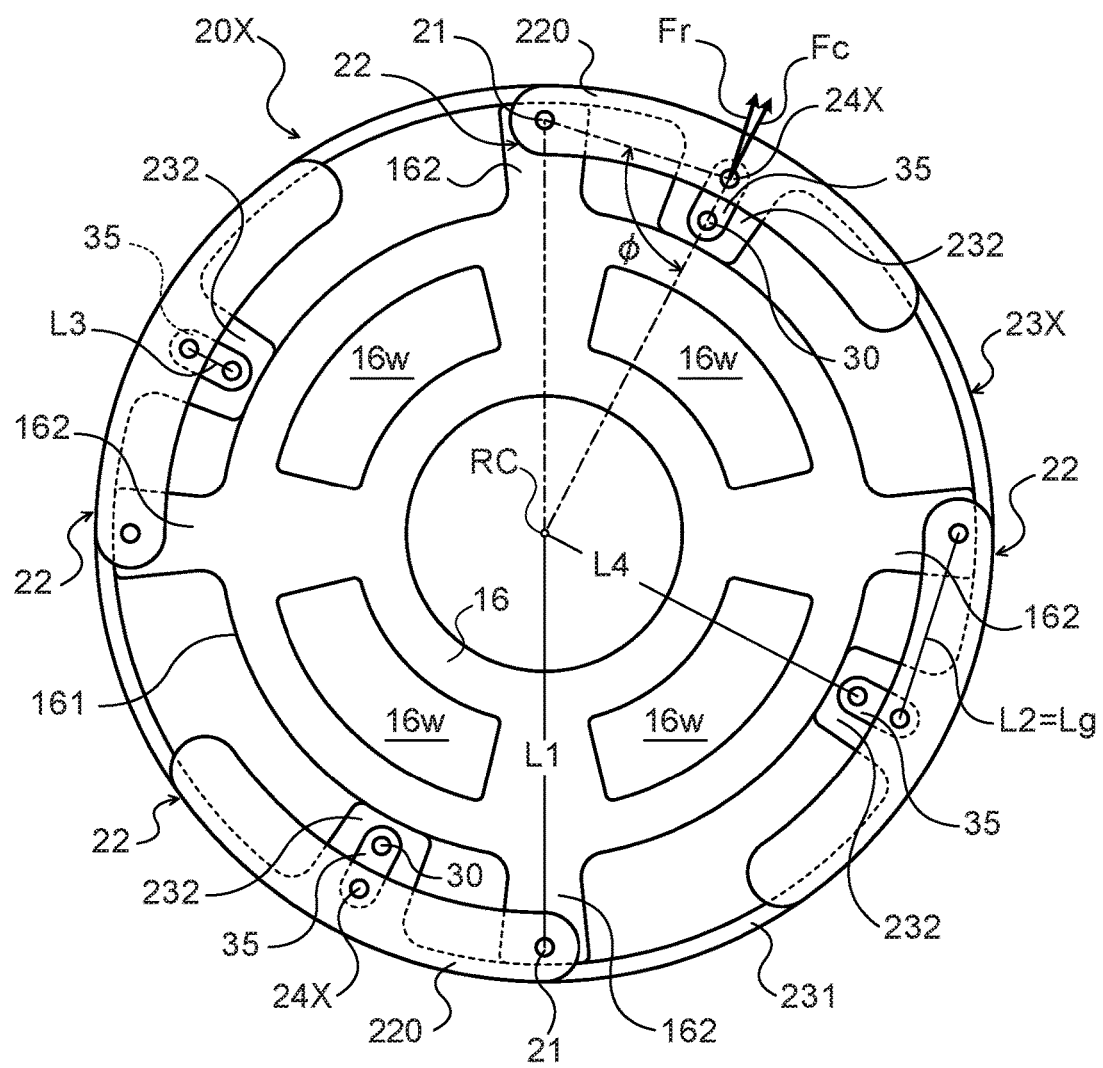
FIG. 11 is a front view of still another vibration damping device according to the present disclosure.

As in a vibration damping device 20X illustrated in FIG. 11, in addition, the guide portions 235 in the vibration damping device 20 may be omitted, and connecting rods 35 illustrated in the drawing may be used instead. The connecting rods 35 are each rotatably coupled to the crank member 22 via a second coupling shaft 24X, and rotatably coupled to the projecting portion 232 of an inertial mass body 23X via a third coupling shaft 30. Such a vibration damping device 20X is also designed on the basis of the above formula (1) or (2) to achieve functions and effects that are similar to those of the vibration damping device 20. Also in the vibration damping device 20X, design values of the moments of inertia $J_1$ and $J_2$, the interaxial distances L3 and L4, and the mass m can be determined through numerical calculation using software such as the LMS Imagine.Lab Amesim discussed above, for example.

Figure 12:
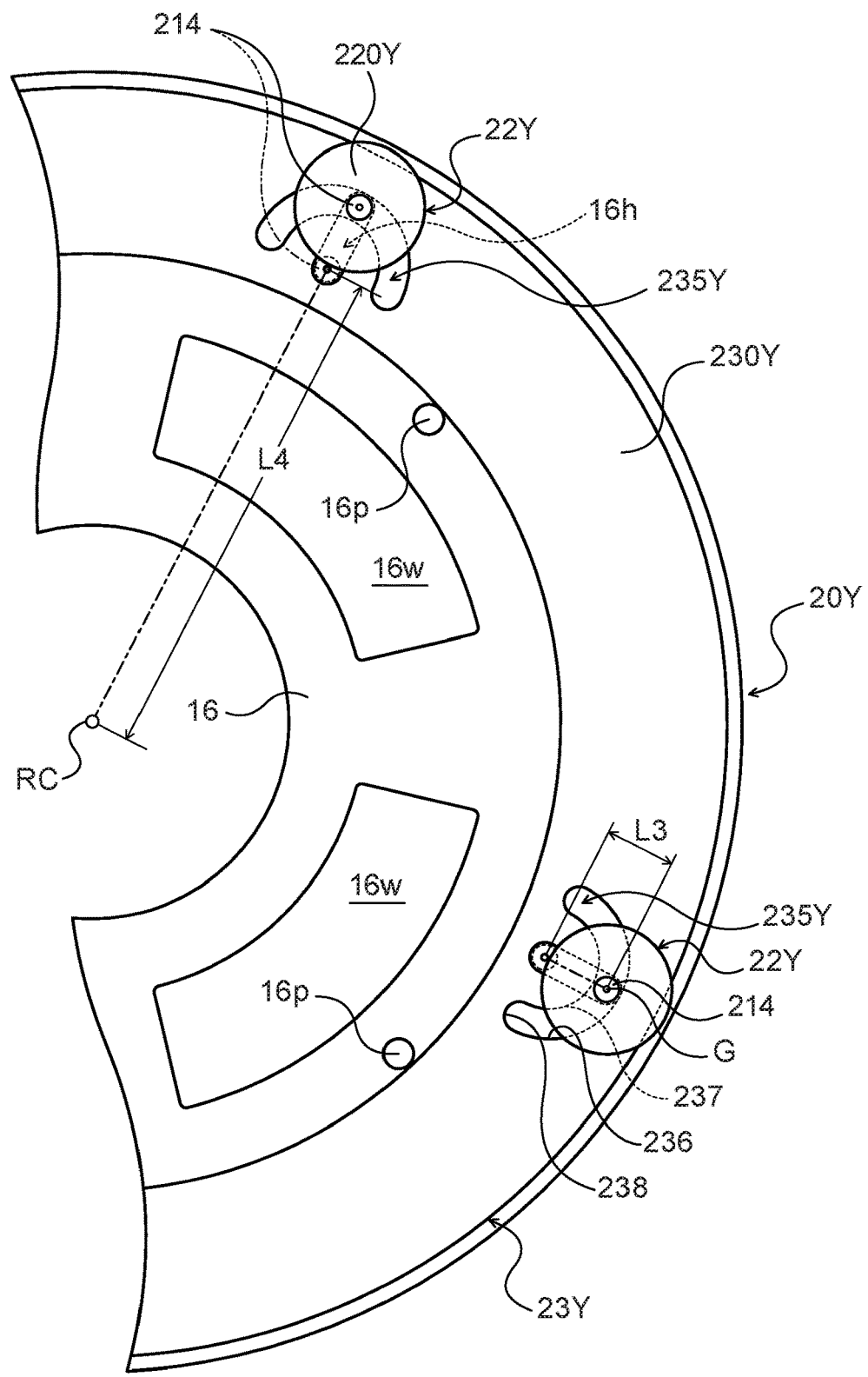
FIG. 12 is an enlarged view illustrating another vibration damping device according to the present disclosure.
Figure 13:
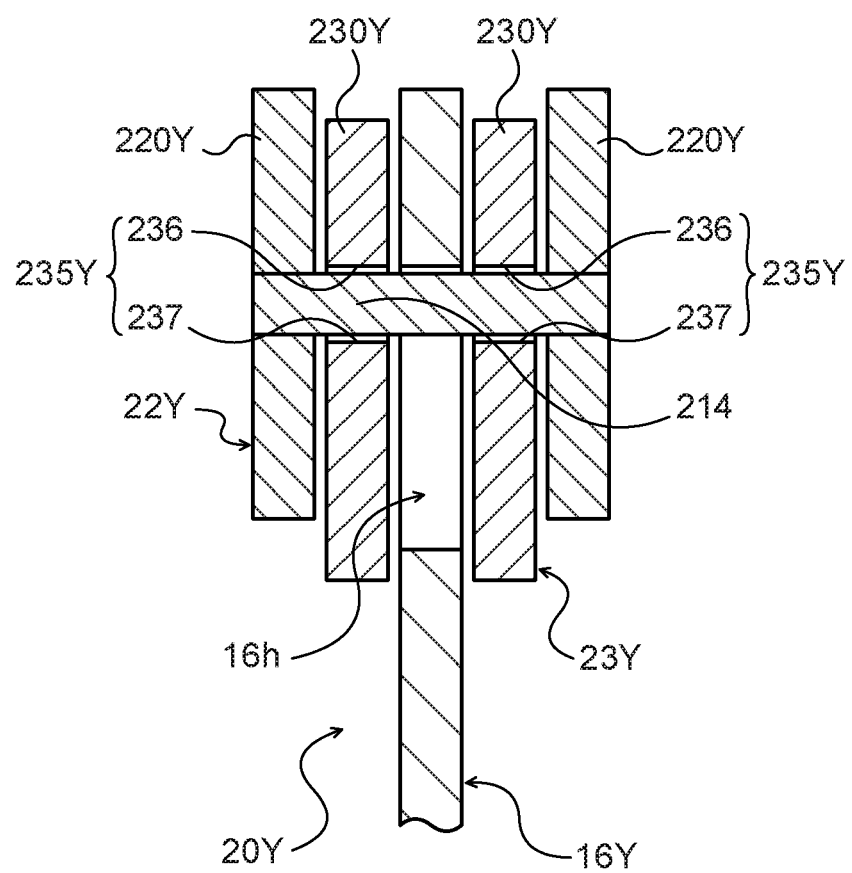
FIG. 13 is an enlarged sectional view illustrating an essential portion of the vibration damping device illustrated in FIG. 12.

FIG. 12 is an enlarged view illustrating another vibration damping device 20Y according to the present disclosure. FIG. 13 is an enlarged sectional view illustrating an essential portion of the vibration damping device 20Y. The vibration damping device 20Y illustrated in the drawings includes: a driven plate 16Y that serves as a support member configured in the same manner as the first driven plate 16; a plurality of (e.g. four in the present embodiment) weight bodies 22Y that serve as a restoring force generation member rotatably coupled to the first driven plate 16Y via respective coupling shafts 214; and a single annular inertial mass body 23Y coupled to the driven plate 16Y and the weight bodies 22Y via the coupling shafts 214.

As illustrated in FIGS. 12 and 13, the driven plate 16Y has a plurality of (e.g. four at intervals of 90° in the present embodiment) long holes (through holes) 16h (first guide portion) disposed in the outer peripheral portion of the driven plate 16Y at intervals (equal intervals) in the circumferential direction. As illustrated in the drawings, the long holes 16h each guide the coupling shaft 214, that is, the weight body 22Y, which is formed in a solid (or hollow) round bar shape, and are each formed in the driven plate 16Y such that the center axis which extends in the longitudinal direction extends in the radial direction of the driven plate 16Y to pass through the center of rotation RC. The width (the inner dimension in a direction that is orthogonal to the longitudinal direction) of the long hole 16h is determined to be slightly larger than the outside diameter of the coupling shaft 214. As illustrated in FIG. 13, the weight bodies 22Y each have two plate members 220Y coupled to each other via the coupling shaft 214. In the present embodiment, the plate members 220Y are each formed in a disc shape from a metal plate. Further, the coupling shaft 214 is fixed (coupled) to the two plate members 220Y such that the axis of the coupling shaft 214 passes through the center of gravity G of the weight body 22Y.

The inertial mass body 23Y includes two annular members 230Y formed from a metal plate. The weight of the inertial mass body 23Y (two annular members 230Y) is determined to be sufficiently larger than the weight of one weight body 22Y. As illustrated in FIGS. 12 and 13, the annular members 230Y each have a plurality of (e.g. four at intervals of 90° in the present embodiment) guide portions 235Y (second guide portion) disposed at intervals (equal intervals) in the circumferential direction. The guide portions 235Y are each an opening portion that extends arcuately, and each guide the coupling shaft 214, that is, the weight body 22Y.

As illustrated in the drawings, the guide portions 235Y each include: a guide surface 236 in a recessed curved surface shape; a support surface 237 in a projecting curved surface shape provided on the inner peripheral side of the annular member 230Y (a portion close to the center of the annular members 230Y) with respect to the guide surface 236 to face the guide surface 236; and two stopper surfaces 238 that are continuous with the guide surface 236 and the support surface 237 on both sides of the guide surface 236 and the support surface 237. In the present embodiment, the guide surface 236 is a recessed circular columnar surface that has a constant radius of curvature. The support surface 237 is a projecting curved surface that extends arcuately. The stopper surfaces 238 are each a recessed curved surface that extends arcuately. In addition, the clearance between the guide surface 236 and the support surface 237 is determined to be slightly larger than the outside diameter of the coupling shaft 214. As illustrated in FIG. 12, the guide portion 235Y (the guide surface 236, the support surface 237, and the stopper surfaces 238) are formed to be transversely symmetrical with respect to a line that passes through the center of curvature of the guide surface 236 and the center of the annular members 230Y (the center of rotation RC of the driven plate 16Y).

As illustrated in FIG. 13, the two annular members 230Y are disposed coaxially with the driven plate 16Y on both sides in the axial direction of the driven plate 16Y, with one annular member 230Y on each side, such that the guide portions 235Y corresponding to each other face each other in the axial direction of the annular members 230Y. Further, the inner peripheral surfaces of the two annular members 230Y are supported by a plurality of protrusions 16p (see FIG. 12) provided on the driven plate 16Y and projecting in the axial direction. Consequently, the annular members 230Y (inertial mass body 23Y) are supported by the driven plate 16Y so as to be rotatable about the center of rotation RC.

In addition, the two plate members 220Y are disposed so as to face each other in the axial direction via the corresponding driven plate 16Y and two annular members 230Y, and are coupled to each other by the coupling shaft 214. As illustrated in FIG. 13, the coupling shaft 214 which couples the two plate members 220Y to each other penetrates the associated long hole 16h of the driven plate 16Y and the associated guide portions 235Y of the two annular members 230Y. Consequently, the driven plate 16Y, the weight bodies 22Y, and the inertial mass body 23Y are coupled to each other via the coupling shafts 214, and the coupling shafts 214 are each movable along both the associated long hole 16h of the driven plate 16Y and the associated guide portions 235Y of the inertial mass body 23Y.

In the vibration damping device 20Y discussed above, the weight bodies 22Y (coupling shaft 214) constitute a sliding pair with the driven plate 16Y and the inertial mass body 23Y, and the driven plate 16Y and the inertial mass body 23Y constitute a turning pair. Consequently, the driven plate 16Y which has the long holes 16h, the plurality of weight bodies 22Y, and the inertial mass body 23Y which has the guide portions 235Y constitute a slider crank mechanism (double slider crank chain). In addition, the vibration damping device 20Y is in the equilibrium state when the coupling shafts 214 are positioned at the center of the guide portions 235Y in the circumferential direction and positioned at end portions of the long holes 16h on the radially outer side (see FIG. 12).

When the driven plate 16Y starts rotating with the vibration damping device 20Y in the equilibrium state, each of the coupling shafts 214 which couples the two plate members 220Y to each other is pressed against the guide surfaces 236 of the guide portions 235Y of the inertial mass body 23Y by the action of a centrifugal force on the weight body 22Y to roll or slide on the guide surfaces 236 toward first end portions of the guide portions 235Y. Along with rotation of the driven plate 16Y, further, the coupling shaft 214 is moved in the radial direction of the driven plate 16Y along the long hole 16h of the driven plate 16Y toward an end portion of the long hole 16h on the radially inner side. When the coupling shaft 214 reaches the first end portions of the guide portions 235Y and an end portion of the long hole 16h on the radially inner side, in addition, a component force of the centrifugal force which acts on the weight body 22Y acts as a restoring force that acts to return the coupling shaft 214 into the equilibrium state. Consequently, the coupling shaft 214 rolls or slides toward second end portions of the guide portions 235Y on the guide surfaces 236, and are moved in the radial direction of the driven plate 16Y along the long hole 16h toward an end portion of the long hole 16h on the radially outer side.

Thus, when the driven plate 16Y is rotated, the weight body 22Y is reciprocally moved (swung) in the radial direction with respect to the driven plate 16Y in the long hole 16h, and reciprocally moved (swung) with respect to the inertial mass body 23Y along the guide portions 235Y. As a result, the inertial mass body 23Y is swung (reciprocally rotated) about the center of rotation RC of the first driven plate 16Y along with movement (swinging motion) of the weight body 22Y. Consequently, vibration that is opposite in phase to vibration transferred from the engine EG to the drive member 11 is applied from the inertial mass body 23Y which is swung to the driven plate 16Y via the guide portions 235Y and the coupling shafts 214, which makes it possible to damp vibration of the driven plate 16Y.

The vibration damping device 20Y discussed above is also designed on the basis of the above formula (1) or (2) to achieve functions and effects that are similar to those of the vibration damping devices 20 and 20X. That is, the vibration damping device 20Y which is a slider crank mechanism is preferably designed such that the effective order $q_{eff}$ is not varied even if the amplitude of vibration of the input torque transferred from the engine EG to the driven member 15 is varied, or the effective order $q_{eff}$ becomes higher as the amplitude λ becomes larger, on the basis of the following formula (10) or (11) which is obtained by substituting Lg/L2=1 into "Lg/L2" in the above formula (1) or (2). In this case, in the formula (10) or (11), the distance between the center of gravity G of the weight bodies 22Y and the support point for swinging motion of the weight bodies 22Y along the guide portions 235Y (second guide portion) may be defined as "L3", and the distance between the support point for swinging motion of the weight bodies 22Y along the guide portions 235Y and the center of rotation RC may be defined as "L4" (see FIG. 12). In the present embodiment, the support point for swinging motion of the weight bodies 22Y along the guide portions 235Y coincides with the center of curvature of the guide surfaces 236 (guide portions 235Y).

$$L4/(L3+L4)=\alpha+\beta \cdot n+\gamma \quad (10)$$

$$L4/(L3+L4)>\alpha+\beta \cdot n+\gamma \quad (11)$$

Figure 14:
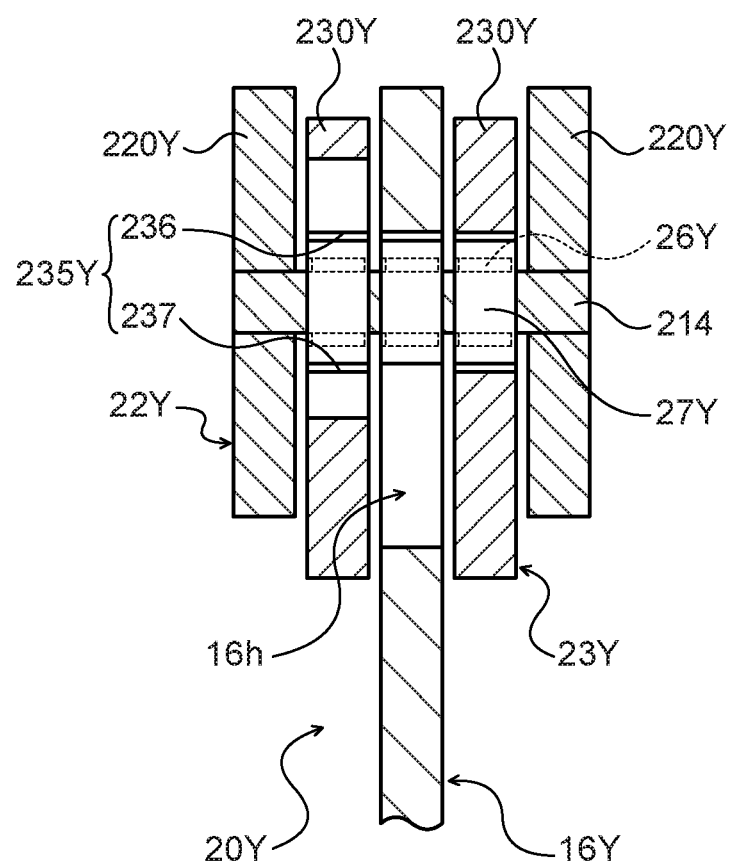
FIG. 14 is an enlarged sectional view illustrating an essential portion of a modification of the vibration damping device illustrated in FIG. 12.

As illustrated in FIG. 14, the vibration damping device 20Y may be provided with a plurality of cylindrical outer rings 27Y rotatably supported by the coupling shaft 214 via a plurality of rollers (or balls, i.e. rolling bodies) 26Y to constitute rolling bearings. In the example illustrated in FIG. 14, three outer rings 27Y are mounted on the coupling shaft 214 so as to roll or slide on the inner surface of the long hole 16h of the driven plate 16Y and the guide portions 235Y (guide surfaces 236) of the inertial mass body 23Y (annular members 230Y). Consequently, it is possible to swing the weight bodies 22Y and the inertial mass body 23Y more smoothly.

Figure 15:
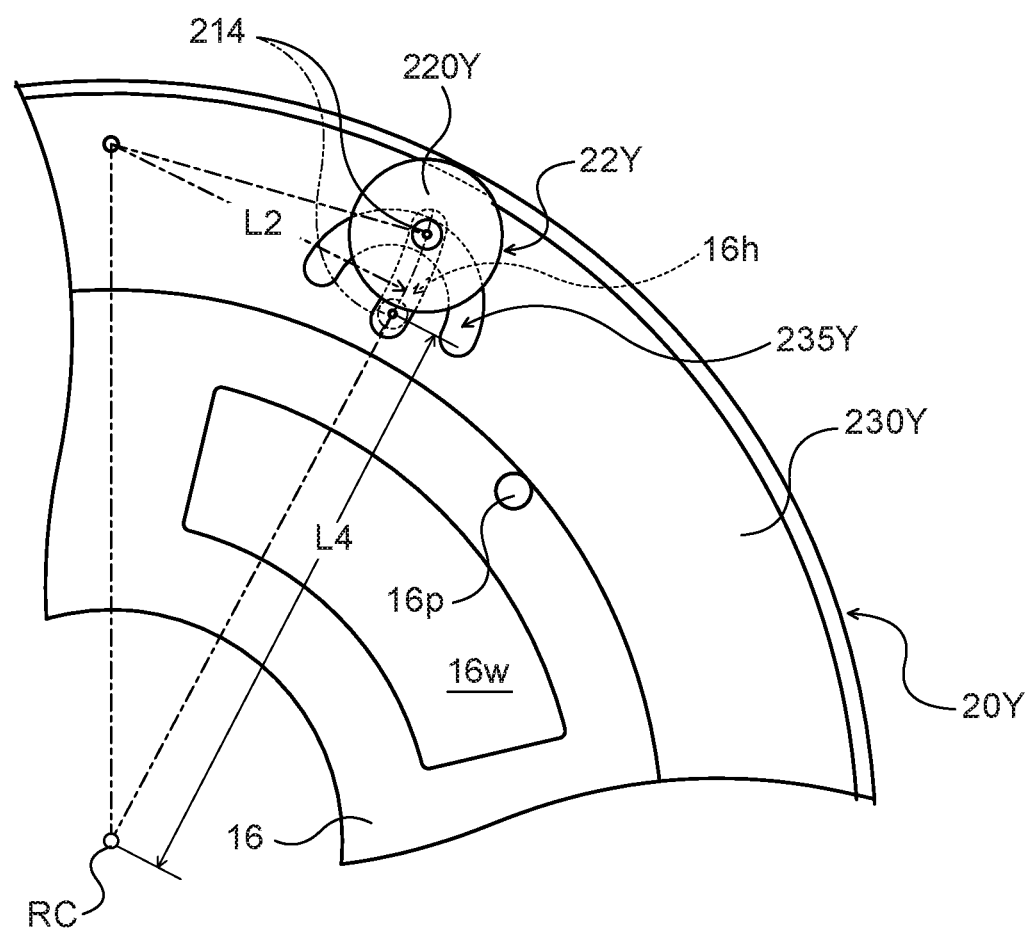
FIG. 15 is an enlarged view illustrating an essential portion of another modification of the vibration damping device illustrated in FIG. 12.

In the vibration damping device 20Y, in addition, the guide surface 236 of the guide portion 235Y is a recessed circular columnar surface that has a constant radius of curvature. However, the guide surface 236 may be a recessed curved surface formed such that the radius of curvature is varied stepwise or gradually. Further, the support surface 237 and the stopper surfaces 238 may be omitted from the guide portion 235Y. In the vibration damping device 20Y, in addition, the inertial mass body 23Y does not necessarily need to be supported so as to be rotatable about the center of rotation RC by the driven plate 16Y. Swinging motion of the inertial mass body 23Y can be made transversely symmetrical by forming the long hole 16h in the driven plate 16Y such that the center axis of the long hole 16h extends in the radial direction of the driven plate 16Y to pass through the center of rotation RC. However, the long hole 16h is not limited thereto. That is, as illustrated in FIG. 15, the long hole 16h may be formed in the driven plate 16Y such that the center axis of the long hole 16h extends arcuately. In this case, as illustrated in FIG. 15, the vibration damping device 20Y can be caused to operate in the same manner as the vibration damping device 20 by determining the center of curvature of the center axis of the long hole 16h on the center axis of the first coupling shaft 21 in the vibration damping device 20, and causing the radius of curvature of the center axis of the long hole 16h to coincide with the interaxial distance L2 between the first coupling shaft 21 and the second coupling shaft 24 in the vibration damping device 20.

Figure 16:
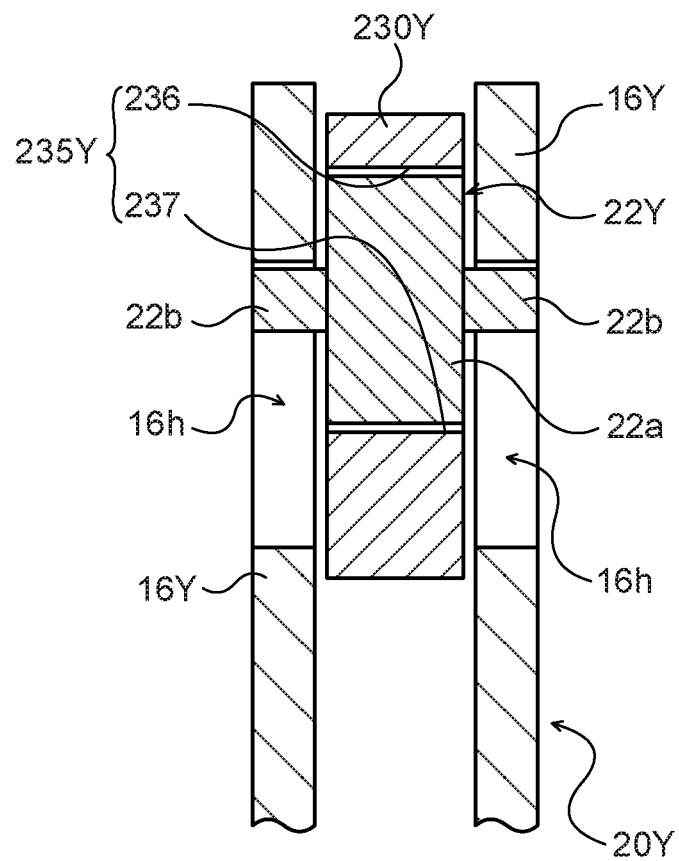
FIG. 16 is an enlarged sectional view illustrating an essential portion of a modification of the vibration damping device illustrated in FIG. 12.

Further, as illustrated in FIG. 16, the vibration damping device 20Y which is a slider crank mechanism may include: two driven plates 16Y that serve as a support member; an inertial mass body 23Y that is a single annular member disposed between the two driven plates 16Y in the axial direction; and a plurality of weight bodies 22Y each guided by long holes 16h of the driven plates 16Y and a guide portion 235Y (guide surface 236) of the inertial mass body 23Y. In this case, as illustrated in the drawing, the weight bodies 22Y may each include a body 22a with a large diameter guided by the guide portion 235Y of the inertial mass body 23Y and shaft portions 22b that extend from the body 22a toward both sides in the axial direction so as to be guided by the long holes 16h of the respective driven plates 16Y.

In the vibration damping device 20Y, in addition, a guide portion (second guide portion) corresponding to the guide portion 235Y may be formed in the weight body 22Y, and the coupling shaft 214 may be coupled (fixed) to the inertial mass body 23Y. Further, a first guide portion corresponding to the long hole 16h may be provided in the weight body 22Y. In this case, a second guide portion corresponding to the guide portion 235Y may be provided in either the driven plates 16Y (support member) or the inertial mass body 23Y, and the coupling shaft 214 may be provided on the other of the driven plates 16Y and the inertial mass body 23Y. In addition, a first guide portion corresponding to the long hole 16h may be provided in the inertial mass body 23Y. In this case, a second guide portion corresponding to the guide portion 235Y may be provided in either the driven plates 16Y or the weight body 22Y, and the coupling shaft 214 may be provided on the other of the driven plates 16Y and the weight body 22Y.

Figure 17:
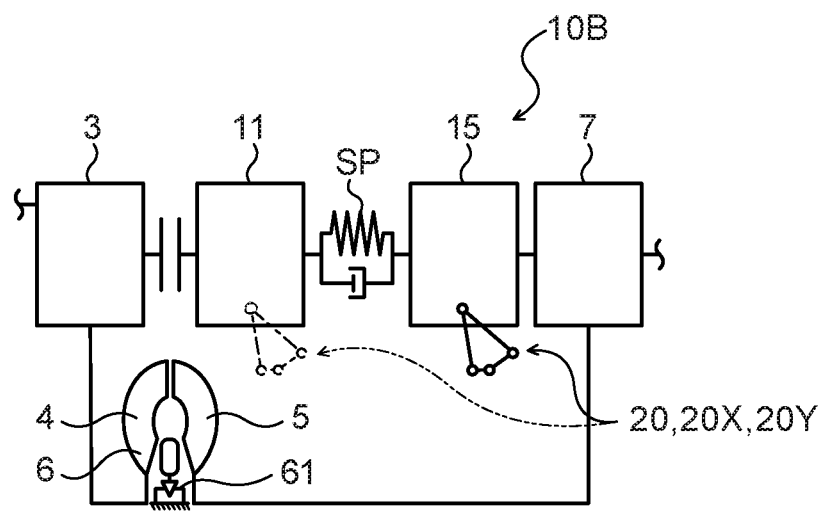
FIG. 17 is a schematic diagram illustrating a modification of the damper device which includes the vibration damping device according to the present disclosure.

The vibration damping device 20, 20X, 20Y may be coupled to the intermediate member 12 of the damper device 10, or may be coupled to the drive member (input element) 11 (see the dash-double-dot line in FIG. 1). In addition, the vibration damping device 20, 20X, 20Y may be applied to a damper device 10B illustrated in FIG. 17. The damper device 10B of FIG. 17 corresponds to the damper device 10 from which the intermediate member 12 has been omitted, and includes the drive member (input element) 11 and the driven member 15 (output element) as rotary elements, and also includes springs SP disposed between the drive member 11 and the driven member 15 as a torque transfer element. In this case, the vibration damping device 20, 20X, 20Y may be coupled to the driven member 15 of the damper device 10B as illustrated in the drawing, or may be coupled to the drive member 11 as indicated by the dash-double-dot line in the drawing.

Figure 18:
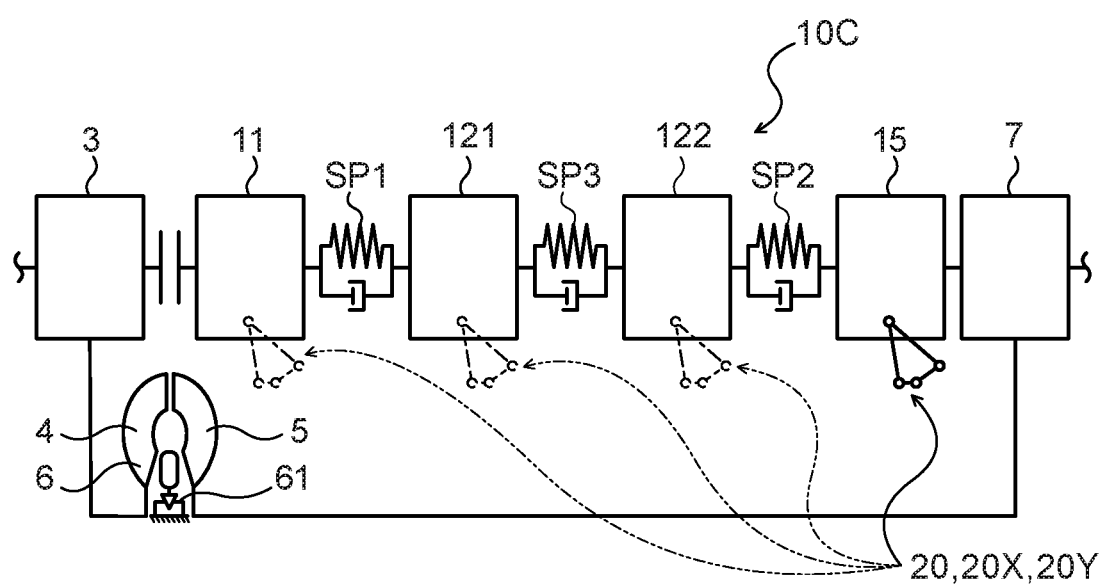
FIG. 18 is a schematic diagram illustrating another modification of the damper device which includes the vibration damping device according to the present disclosure.

Further, the vibration damping device 20, 20X, 20Y may be applied to a damper device 10C illustrated in FIG. 18. The damper device 10C of FIG. 18 includes the drive member (input element) 11, a first intermediate member (first intermediate element) 121, a second intermediate member (second intermediate element) 122, and the driven member (output element) 15 as rotary elements, and also includes first springs SP1 disposed between the drive member 11 and the first intermediate member 121, second springs SP2 disposed between the second intermediate member 122 and the driven member 15, and third spring SP3 disposed between the first intermediate member 121 and the second intermediate member 122 as torque transfer elements. In this case, the vibration damping device 20, 20X, 20Y may be coupled to the driven member 15 of the damper device 10C as illustrated in the drawing, or may be coupled to the first intermediate member 121, the second intermediate member 122, or the drive member 11 as indicated by the dash-double-dot line in the drawing. In any case, by coupling the vibration damping device 20, 20X, 20Y to a rotary element of the damper device 10, 10B, or 10C, it is possible to damp vibration significantly well using both the damper device 10 to 10C and the vibration damping device 20, 20X, 20Y while suppressing an increase in weight of the damper device 10 to 10C.

As has been described above, the present disclosure provides a vibration damping device (20, 20X, 20Y) disposed in an oil chamber (9) and including: a support member (16, 16Y) that rotates together with a rotary element (15), to which torque from an engine (EG) is transferred, about a center of rotation (RC) of the rotary element (15); a restoring force generation member (22, 22Y) that is coupled to the support member (16, 16Y) and that is swingable along with rotation of the support member (16, 16Y); and an inertial mass body (23, 23X, 23Y) coupled to the support member (16, 16Y) via the restoring force generation member (22, 22Y) and swung about the center of rotation (RC) in conjunction with the restoring force generation member (22, 22Y) along with rotation of the support member (16, 16Y). In the vibration damping device (20, 20X, 20Y), an order ($q_{eff}$) of the vibration damping device (20, 20X, 20Y) is larger than a sum of an excitation order ($q_{tag}$) of the engine (EG) and an offset value ($\Delta q$) determined in consideration of an effect of oil in the oil chamber (9), and a reference order ($q_{ref}$), which is a convergent value of the order ($q_{eff}$) of the vibration damping device which operates in the oil chamber (9) when an amplitude ($\lambda$) of vibration of input torque transferred to the rotary element (15) becomes smaller, is higher than the excitation order ($q_{tag}$).

As discussed above, the studies conducted by the inventors revealed that the vibration damping performance of the vibration damping device, which included the restoring force generation member and the inertial mass body which was swung in conjunction with the restoring force generation member, was further improved by making the reference order, which was a convergence value of the order of the vibration damping device when the amplitude of vibration of the input torque became smaller, higher than the excitation order of the engine, rather than by causing the reference order to coincide with the excitation order. Thus, with the vibration damping device which is disposed in the oil chamber, it is possible to further improve the vibration damping performance of the vibration damping device, which includes the restoring force generation member and the inertial mass body which is swung in conjunction with the restoring force generation member, by making the order of the vibration damping device larger than the sum of the excitation order of the engine and an offset value determined in consideration of the effect of oil in the oil chamber and making the reference order higher than the excitation order of the engine.

The vibration damping device (20, 20X, 20Y) may be designed such that when the reference order is defined as "$q_{ref}$" and the excitation order is defined as "$q_{tag}$", $1.00 \times q_{tag} < q_{ref} < 1.03 \times q_{tag}$ (more preferably $1.01 \times q_{tag} \leq q_{ref} \leq 1.02 \times q_{tag}$) is met. Consequently, it is possible to improve the vibration damping performance of the vibration damping device, which includes the restoring force generation member and the inertial mass body which is swung in conjunction with the restoring force generation member, significantly well.

The vibration damping device (20, 20X, 20Y) may be designed such that the order ($q_{eff}$) of the vibration damping device becomes higher, or the order ($q_{eff}$) is not varied, as the amplitude ($\lambda$) of the vibration of the input torque becomes larger. Consequently, a reduction in vibration damping performance due to a deviation of the order in a region in which the rotational speed of the engine is low can be suppressed even if there occurs a deviation of the order of the vibration damping device as the amplitude of vibration of the input torque becomes larger. As a result, it is possible to further improve the vibration damping performance in the region in which the rotational speed of the engine is low.

The vibration damping device (20Y) may further include: a first guide portion (16h) that is provided in one of the support member (16Y), the restoring force generation member (22Y), and the inertial mass body (23Y) and that extends along a radial direction of the support member (16Y); and a second guide portion (235Y) that is formed in one of two other than the one of the support member (16Y), the restoring force generation member (22Y), and the inertial mass body (23Y) and that extends arcuately, and the other of the two other than the one of the support member (16Y), the restoring force generation member (22Y), and the inertial mass body (23Y) may be guided by the first and second guide portions (16h, 235Y). With such a vibration damping device, it is possible to further improve the vibration damping performance, while suppressing an increase in weight or size of the entire device, by causing the order of the vibration damping device to become higher as the amplitude of vibration of the input torque becomes larger.

The vibration damping device (20) may further include: a first coupling shaft (21) that couples the support member (16) and the restoring force generation member (22) so as to be rotatable relative to each other; a second coupling shaft (24) that is supported by one of the restoring force generation member (22) and the inertial mass body (23) and that couples the restoring force generation member (22) and the inertial mass body (23) so as to be rotatable relative to each other; and a guide portion (235, 235X) that is formed in the other of the restoring force generation member (22) and the inertial mass body (23) and that guides the second coupling shaft (24) such that the second coupling shaft (24) is swung about the first coupling shaft (21) while keeping an interaxial distance (L2) between the first coupling shaft (21) and the second coupling shaft (24) constant, and such that the second coupling shaft (24) is swung about a virtual shaft (25), a relative position of which with respect to the inertial mass body (23) is determined to be invariable, while keeping an interaxial distance (L3) between the virtual shaft (25) and the second coupling shaft (24) constant, along with rotation of the support member (16). Consequently, it is possible to further improve the vibration damping performance while suppressing an increase in weight or size of the entire vibration damping device.

The vibration damping device (20X) may further include a connecting member (35) rotatably coupled to the restoring force generation member (22) via a second coupling shaft (24X) and rotatably coupled to the inertial mass body (23X) via a third coupling shaft (30).

When an interaxial distance between the center of rotation (RC) of the rotary element (15) and the first coupling shaft (21) is defined as "L1", an interaxial distance between the first coupling shaft (21) and the second coupling shaft (24, 24X) is defined as "L2", an interaxial distance between the second coupling shaft (24, 24X) and the third coupling shaft (25, 30) is defined as "L3", and an interaxial distance between the third coupling shaft (25, 30) and the center of rotation (RC) is defined as "L4", the vibration damping device (20, 20X) may meet L1+L2>L3+L4. Consequently, the effect of the weight of the restoring force generation member on the equivalent mass of the vibration damping device can be made very small, which can further improve the degree of freedom in setting of the equivalent rigidity and the equivalent mass, that is, the vibration order. As a result, it is possible to improve the vibration damping performance significantly well while suppressing an increase in weight or size of the restoring force generation member and hence the entire device.

The support member (16, 16Y) may rotate coaxially and together with a rotary element of a damper device (10, 10B, 10C) that has a plurality of rotary elements (11, 12, 121, 122, 15) that include at least an input element (11) and an output element (15), and an elastic body (SP, SP1, SP2, SP3) that transfers torque between the input element (11) and the output element (15). By coupling the vibration damping device to the rotary element of the damper device in this way, it is possible to damp vibration significantly well using both the damper device and the vibration damping device while suppressing an increase in weight of the damper device.

The output element (15) of the damper device (10, 10B, 10C) may be functionally (directly or indirectly) coupled to an input shaft (IS) of a transmission (TM).

The present disclosure also provides a method of designing a vibration damping device (20, 20X, 20Y) including: a support member (16, 16Y) that rotates together with a rotary element (15), to which torque from an engine (EG) is transferred, about a center of rotation (RC) of the rotary element (15); a restoring force generation member (22, 22Y) that is coupled to the support member (16, 16Y) and that is swingable along with rotation of the support member (16, 16Y); and an inertial mass body (23, 23X, 23Y) coupled to the support member (16, 16Y) via the restoring force generation member (22, 22Y) and swung about the center of rotation (RC) in conjunction with the restoring force generation member (22, 22Y) along with rotation of the support member (16, 16Y) The method includes: preparing a dynamic model that includes the vibration damping device (20, 20X, 20Y) and a vibration suppression target (DS) to which torque from the engine (EG) is transferred (step S100); deriving, for each of a plurality of orders ($q_{eff}$) of the vibration damping device (20, 20X, 20Y), torque fluctuations ($T_{Fluc}$) of the vibration suppression target (DS) when an external force from the engine (EG) acts by substituting a design parameter ($J_1$, $J_2$, L3, L4, m) of the vibration damping device (20, 20X, 20Y) corresponding to the order ($q_{eff}$) into a group of equations derived from the dynamic model (steps S110, S120, S130, and S140); and determining the design parameter ($J_1$, $J_2$, L3, L4, m) which brings the derived torque fluctuations ($T_{Fluc}$) of the vibration suppression target (DS) to a target value as a design value (steps S150 and S160).

By designing the vibration damping device by such a method, it is possible to further improve the vibration damping performance by causing the reference order, which is a convergent value of the order of the vibration damping device, to fall within an adequate range that is larger than the excitation order of the engine.

The target value may be determined to be smaller than the torque fluctuations ($T_{Fluc}$) of the vibration suppression target (DS) when a reference order ($q_{ref}$), which is a convergent value of the order of the vibration damping device (20, 20X, 20Y), coincides with an excitation order ($q_{tag}$) of the engine (EG).

The dynamic model may simulate a structure of a vehicle from the engine (EG) to wheels (W), including the vibration damping device (20, 20X, 20Y) and the vibration suppression target (DS).

The torque fluctuations ($T_{Fluc}$) may be derived while changing the design parameter ($J_1$, $J_2$, L3, L4, m) such that a reference order ($q_{ref}$), which is a convergent value of the order ($q_{eff}$) of the vibration damping device (20, 20X, 20Y) when an amplitude of vibration of torque transferred to the rotary element (15) becomes smaller, becomes higher (steps S100 to S140), and the design parameter ($J_1$, $J_2$, L3, L4, m) which brings a peak value of the torque fluctuations ($T_{Fluc}$) in a predetermined rotational speed range to a minimum value (MIN) or a value around the minimum value may be determined as the design value (steps S150 and S160).

The present disclosure further provides a vibration damping device (20, 20X, 20Y) of a dry type, including: a support member (16, 16Y) that rotates together with a rotary element (15), to which torque from an engine (EG) is transferred, about a center of rotation (RC) of the rotary element (15); a restoring force generation member (22, 22Y) that is coupled to the support member (16, 16Y) and that is swingable along with rotation of the support member (16, 16Y); and an inertial mass body (23, 23X, 23Y) coupled to the support member (16, 16Y) via the restoring force generation member (22, 22Y) and swung about the center of rotation (RC) in conjunction with the restoring force generation member (22, 22Y) along with rotation of the support member (16, 16Y). In the vibration damping device (20, 20X, 20Y), a reference order ($q_{ref}$), which is a convergent value of an order ($q_{eff}$) of the vibration damping device when an amplitude ($\lambda$) of vibration of input torque transferred to the rotary element becomes smaller, is higher than an excitation order ($q_{tag}$) of the engine (EG).

In this way, it is possible to further improve the vibration damping performance of the vibration damping device of a dry type, which includes the restoring force generation member and the inertial mass body which is swung in conjunction with the restoring force generation member, by making the reference order higher than the excitation order of the engine.

The vibration damping device (20, 20X, 20Y) of a dry type may be designed such that when the reference order is defined as "$q_{ref}$" and the excitation order is defined as "$q_{tag}$", $1.00 \times q_{tag} < q_{ref} \leq 1.03 \times q_{tag}$, more preferably $1.01 \times q_{tag} \leq q_{ref} \leq 1.02 \times q_{tag}$, is met. Consequently, it is possible to improve the vibration damping performance of the vibration damping device of a dry type, which includes the restoring force generation member and the inertial mass body which is swung in conjunction with the restoring force generation member, significantly well.

The to the various aspects of the present disclosure are not limited to the embodiment described above in any way, and it is a matter of course that these aspects may be modified in various ways within the extensive scope of the disclosure. Further, the mode for carrying out the embodiments described above is merely a specific form of the embodiments described in the "SUMMARY" section, and does not limit the elements of the aspects described in the "SUMMARY" section.

INDUSTRIAL APPLICABILITY

The various aspects according to the present disclosure can be utilized in the field of manufacture of vibration damping devices that damp vibration of a rotary element.

The invention claimed is:

1. A vibration damping device disposed in an oil chamber and comprising:
   a support member that rotates together with a rotary element, to which torque from an engine is transferred, about a center of rotation of the rotary element;
   a restoring force generation member that is coupled to the support member and that is swingable along with rotation of the support member; and
   an inertial mass body coupled to the support member via the restoring force generation member and swung about the center of rotation in conjunction with the restoring force generation member along with rotation of the support member, the inertial mass body has a swing center that is the same as a center of rotation of the support member, wherein
   an order of the vibration damping device is larger than a sum of an excitation order of the engine and an offset value determined in consideration of an effect of oil in the oil chamber; and
   a reference order, which is a convergent value of the order of the vibration damping device which operates in the oil chamber when an amplitude of vibration of input torque transferred to the rotary element becomes smaller, is higher than the excitation order.

2. The vibration damping device according to claim 1, wherein
   when the reference order is defined as "$q_{ref}$" and the excitation order is defined as "$q_{tag}$", $1.00 \times q_{tag} < q_{ref} \leq 1.03 \times q_{tag}$ is met.

3. The vibration damping device according to claim 1, wherein when the reference order is defined as "$q_{ref}$" and the excitation order is defined as "$q_{tag}$", $1.01 \times q_{tag} \leq q_{ref} \leq 1.02 \times q_{tag}$ is met.

4. The vibration damping device according to claim 1, wherein
   the vibration damping device is designed such that the order of the vibration damping device becomes higher, or the order is not varied, as the amplitude of the vibration of the input torque becomes larger.

5. The vibration damping device according to claim 1, further comprising:
   a first guide portion that is provided in one of the support member, the restoring force generation member, and the inertial mass body and that extends along a radial direction of the support member; and
   a second guide portion that is formed in one of two other than the one of the support member, the restoring force generation member, and the inertial mass body and that extends arcuately, wherein:
   the other of the two other than the one of the support member, the restoring force generation member, and the inertial mass body is guided by the first and second guide portions.

6. The vibration damping device according to claim 1, further comprising:
   a first coupling shaft that couples the support member and the restoring force generation member so as to be rotatable relative to each other;
   a second coupling shaft that is supported by one of the restoring force generation member and the inertial mass body and that couples the restoring force generation member and the inertial mass body so as to be rotatable relative to each other; and
   a guide portion that is formed in the other of the restoring force generation member and the inertial mass body and that guides the second coupling shaft such that the second coupling shaft is swung about the first coupling shaft while keeping an interaxial distance between the first coupling shaft and the second coupling shaft constant, and such that the second coupling shaft is swung about a virtual axis, a relative position of which with respect to the inertial mass body is determined to be invariable, while keeping an interaxial distance between the virtual axis and the second coupling shaft constant, along with rotation of the support member.

7. The vibration damping device according to claim 1, further comprising:
   a connecting member rotatably coupled to the restoring force generation member via a coupling shaft and rotatably coupled to the inertial mass body via another coupling shaft.

8. The vibration damping device according to claim 6, wherein
   when an interaxial distance between the center of rotation of the rotary element and the first coupling shaft is defined as "L1", an interaxial distance between the first coupling shaft and the second coupling shaft is defined as "L2", an interaxial distance between the second coupling shaft and the third coupling shaft is defined as "L3", and an interaxial distance between the third coupling shaft and the center of rotation is defined as "L4", L1+L2>L3+L4 is met.

9. The vibration damping device according to claim 1, further comprising a damper device having a plurality of rotary elements that include at least an input element and an output element and an elastic body that transfers torque between the input element and the output element, wherein
   the support member rotates coaxially and together with one of the rotary elements of the damper device.

10. The vibration damping device according to claim 9, wherein
    the output element of the damper device is coupled to an input shaft of a transmission.

11. A method of designing a vibration damping device including:
    a support member that rotates together with a rotary element, to which torque from an engine is transferred, about a center of rotation of the rotary element;
    a restoring force generation member that is coupled to the support member and that is swingable along with rotation of the support member; and
    an inertial mass body coupled to the support member via the restoring force generation member and swung about the center of rotation in conjunction with the restoring force generation member along with rotation of the support member, the method comprising:
    preparing a dynamic model that includes the vibration damping device and a vibration suppression target to which the torque from the engine is transferred;
    deriving, for each of a plurality of orders of the vibration damping device, torque fluctuations of the vibration suppression target when an external force from the engine acts by substituting a design parameter of the vibration damping device corresponding to the order into a group of equations derived from the dynamic model; and
    determining the design parameter which brings the derived torque fluctuations of the vibration suppression target to a target value as a design value.

12. The method of designing a vibration damping device according to claim 11, wherein
    the target value is determined to be smaller than the torque fluctuations of the vibration suppression target when a reference order, which is a convergent value of the order of the vibration damping device, coincides with an excitation order of the engine.

13. The method of designing a vibration damping device according to claim 11, wherein
the dynamic model simulates a structure of a vehicle from the engine to wheels, including the vibration damping device and the vibration suppression target.

14. The method of designing a vibration damping device according to claim 11, wherein
the torque fluctuations are derived while changing the design parameter such that a reference order, which is a convergent value of an order of the vibration damping device when an amplitude of vibration of torque transferred to the rotary element becomes smaller, becomes higher, and the design parameter which brings a peak value of the torque fluctuations in a predetermined rotational speed range to a minimum value is determined as the design value.

15. A vibration damping device of a dry type, comprising: a support member that rotates together with a rotary element, to which torque from an engine is transferred, about a center of rotation of the rotary element; a restoring force generation member that is coupled to the support member and that is swingable along with rotation of the support member; and an inertial mass body coupled to the support member via the restoring force generation member and swung about the center of rotation in conjunction with the restoring force generation member along with rotation of the support member, wherein
a reference order, which is a convergent value of an order of the vibration damping device when an amplitude of vibration of input torque transferred to the rotary element becomes smaller, is higher than an excitation order of the engine.

16. The vibration damping device according to claim 15, wherein
when the reference order is defined as "$q_{ref}$" and the excitation order is defined as "$q_{tag}$", $1.00 \times q_{tag} < q_{ref} \leq 1.03 \times q_{tag}$ is met.

17. The vibration damping device according to claim 15, wherein
when the reference order is defined as "$q_{ref}$" and the excitation order is defined as "$q_{tag}$", $1.01 \times q_{tag} \leq q_{ref} \leq 1.02 \times q_{tag}$ is met.

18. The vibration damping device according to claim 15, wherein
the vibration damping device is designed such that the order of the vibration damping device becomes higher, or the order is not varied, as the amplitude of the vibration of the input torque becomes larger.

19. The vibration damping device according to claim 15, further comprising:
a first guide portion that is provided in one of the support member, the restoring force generation member, and the inertial mass body and that extends along a radial direction of the support member; and
a second guide portion that is formed in one of two other than the one of the support member, the restoring force generation member, and the inertial mass body and that extends arcuately, wherein:
the other of the two other than the one of the support member, the restoring force generation member, and the inertial mass body is guided by the first and second guide portions.

20. The vibration damping device according to claim 15, further comprising:
a first coupling shaft that couples the support member and the restoring force generation member so as to be rotatable relative to each other;
a second coupling shaft that is supported by one of the restoring force generation member and the inertial mass body and that couples the restoring force generation member and the inertial mass body so as to be rotatable relative to each other; and
a guide portion that is formed in the other of the restoring force generation member and the inertial mass body and that guides the second coupling shaft such that the second coupling shaft is swung about the first coupling shaft while keeping an interaxial distance between the first coupling shaft and the second coupling shaft constant, and such that the second coupling shaft is swung about a virtual axis, a relative position of which with respect to the inertial mass body is determined to be invariable, while keeping an interaxial distance between the third coupling shaft and the second coupling shaft constant, along with rotation of the support member.

* * * * *